United States Patent
Kim

(10) Patent No.: US 11,763,147 B2
(45) Date of Patent: Sep. 19, 2023

(54) DATA MANAGEMENT DEVICE FOR SUPPORTING HIGH SPEED ARTIFICIAL NEURAL NETWORK OPERATION BY USING DATA CACHING BASED ON DATA LOCALITY OF ARTIFICIAL NEURAL NETWORK

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 500 days.

(21) Appl. No.: 17/135,655

(22) Filed: Dec. 28, 2020

(65) Prior Publication Data

US 2021/0150352 A1    May 20, 2021

Related U.S. Application Data

(63) Continuation of application No. PCT/KR2020/007305, filed on Jun. 4, 2020.

(30) Foreign Application Priority Data

Jun. 4, 2019  (KR) .................. 10-2019-0065709
Mar. 2, 2020  (KR) .................. 10-2020-0025961

(51) Int. Cl.
*G06F 12/02*      (2006.01)
*G06F 12/0862*   (2016.01)
(Continued)

(52) U.S. Cl.
CPC ........... *G06N 3/08* (2013.01); *G06F 12/0215* (2013.01); *G06F 12/0862* (2013.01);
(Continued)

(58) Field of Classification Search
CPC .......... G06N 3/08; G06N 3/045; G06N 3/049; G06N 3/063; G06F 12/0215;
(Continued)

(56) References Cited

U.S. PATENT DOCUMENTS 5,305,389 A * 4/1994 Palmer ................ G06F 12/0862
                                                    707/999.102
9,542,643 B2   1/2017 Levin et al.
(Continued)

FOREIGN PATENT DOCUMENTS

CN   108509723 A    9/2018
KR   10-1039782 B1  6/2011
(Continued)

OTHER PUBLICATIONS

Korean Intellectual Property Office, Grant of Patent, KR Patent Application No. 10-2020-0025961, dated Oct. 8, 2021, seven pages.
(Continued)

*Primary Examiner* — Tracy A Warren
(74) *Attorney, Agent, or Firm* — Fenwick & West LLP

(57) ABSTRACT

Disclosed is a data cache or data management device for caching data between at least one processor and at least one memory, and supporting an artificial neural network (ANN) operation executed by the at least one processor. The data cache device or the data management device can comprise an internal controller for predicting the next data operation request on the basis of ANN data locality of the ANN operation. The internal controller monitors data operation requests associated with the ANN operation from among data operation requests actually made between the at least one processor and the at least one memory, thereby extracting the ANN data locality of the ANN operation.

20 Claims, 12 Drawing Sheets

(51) Int. Cl.
  *G06N 3/08* (2023.01)
  *G06N 3/049* (2023.01)
  *G06N 3/063* (2023.01)
  *G06N 3/045* (2023.01)

(52) U.S. Cl.
  CPC ............. *G06N 3/045* (2023.01); *G06N 3/049* (2013.01); *G06N 3/063* (2013.01)

(58) Field of Classification Search
  CPC ........... G06F 12/0862; G06F 2212/602; G06F 2212/6022; G06F 2212/6024
  See application file for complete search history.

(56) References Cited

U.S. PATENT DOCUMENTS

| | | | |
|---|---|---|---|
| 9,805,304 | B2 | 10/2017 | Ross |
| 9,836,691 | B1 | 12/2017 | Narayanaswami et al. |
| 2014/0351190 | A1 | 11/2014 | Levin et al. |
| 2017/0103319 | A1 | 4/2017 | Henry et al. |
| 2017/0161604 | A1* | 6/2017 | Craddock ............... G06N 3/063 |
| 2018/0157967 | A1 | 6/2018 | Henry et al. |
| 2019/0057300 | A1 | 2/2019 | Mathuriya et al. |
| 2019/0057302 | A1 | 2/2019 | Cho et al. |
| 2020/0192797 | A1* | 6/2020 | Delerse ............... G06F 12/0875 |
| 2020/0201759 | A1* | 6/2020 | Korzh ................... G06F 3/0685 |

FOREIGN PATENT DOCUMENTS

| | | |
|---|---|---|
| KR | 10-2016-0010477 A | 1/2016 |
| KR | 10-2018-0077260 A | 7/2018 |
| KR | 2019-0018888 A | 2/2019 |
| KR | 10-2019-0058366 A | 5/2019 |

OTHER PUBLICATIONS

PCT International Search Report and Written Opinion, PCT Application No. PCT/KR2020/007305, dated Sep. 9, 2020, 14 pages (with English translation of PCT International Search Report).

* cited by examiner

DATA MANAGEMENT DEVICE FOR SUPPORTING HIGH SPEED ARTIFICIAL NEURAL NETWORK OPERATION BY USING DATA CACHING BASED ON DATA LOCALITY OF ARTIFICIAL NEURAL NETWORK

CROSS-REFERENCE TO RELATED APPLICATIONS

This application is a continuation of International Application No. PCT/KR2020/007305 filed on Jun. 4, 2020 which claims priority to Republic of Korea Patent Application No. 10-2019-0065709 filed on Jun. 4, 2019 and Republic of Korea Patent Application No. 10-2020-0025961 filed on Mar. 2, 2020, each of which is incorporated by reference in its entirety.

TECHNICAL FIELD

The present disclosure relates to a data management device for supporting an artificial neural network operation, and in particular, to a data management method for supporting high speed artificial neural network operation using data caching based on data locality of an artificial neural network, and a device to which the method is applied.

BACKGROUND ART

Interest in artificial intelligence using artificial neural networks (ANNs) is increasing. The artificial neural network can deduce the relevance of parameters inherent in the dataset through data learning.

Recently, convolutional neural networks (CNNs) are widely used in artificial intelligence fields such as image recognition and autonomous vehicles.

The convolutional neural network includes an input layer, an output layer, and one or more inner layers therebetween.

The output layer includes one or more neurons, and each of the input layer and the inner layer includes a plurality of neurons.

Neurons included in adjacent layers are connected in various ways through synapses, and a weight is given to each synapse.

Values of neurons included in the input layer are determined according to an input signal, such as an image to be recognized.

The values of neurons included in the inner layer and the output layer are calculated according to neurons and synapses included in a previous layer.

In the convolutional neural networks connected in this manner, the weight of the synapse is determined through a training operation.

For example, an inference operation of performing image recognition using a convolutional neural network that has been trained is made. For example, an input image determines values of multiple neurons of an input layer and then passes through an inner layer through a number of operations, and a recognition result is output to neurons in an output layer.

Many operations must be performed in both the training operation of the convolutional neural network and the inference operation using the same.

In addition, many memory access operations are performed to store temporary data generated during operations or to read stored temporary data.

Conventionally, there is a problem in that overall operation performance is degraded due to the time required for a data input/output operation between a processor and a memory performing neural network operation.

In an effort to improve the problems of the prior art, an in-memory processing technology including a neural network processor in a memory has been proposed. For example, KR 10-2019-0018888 "a memory device including a neural network processing circuit and a memory system including the same" corresponds to the technology.

In addition, as a neural network processor (NNP), which is a processor that supports artificial neural network operations, U.S. Pat. No. 9,805,304 "prefetching weights for use in a neural network processor" discloses a configuration that optimizes an artificial neural network operation by prefetching weights of networks during an artificial neural network operation along the first dimension of the systolic array for neural network layers.

Among the prior arts, KR 10-2019-0018888 was derived from the motivation to shorten a time required to send and receive data by including a neural network processing circuit that is determined in a memory. In addition, among the prior arts, U.S. Pat. No. 9,805,304 discloses a neural network processor (NNP) dedicated to a specific artificial neural network including a sequencer that performs a next data operation based on structure information of a predetermined artificial neural network.

However, recently, artificial neural network techniques are attempting to improve performance through multiple combinations of various types of networks or dynamically deformable networks. Thus, only with attempts to process neural network processing operations on a memory side or neural networks dedicated to specific artificial neural networks, and optimization of a weight sequencer based on a predetermined artificial neural network in a neural network processor (NNP) dedicated to a certain artificial neural network, the application of various artificial neural network techniques may be restricted in terms of the scope of application.

DETAILED DESCRIPTION OF THE PRESENT DISCLOSURE

Technical Problems

In a general computing system, while performance of a processor that performs an operation is excellent, performance of a memory supplying data that is an object of operation is insufficient compared to the performance of the processor. As a result, the overall operation performance of the system is degraded. In particular, imbalance is a more serious problem in operations of artificial intelligence/artificial neural networks that compute big data. Therefore, it is recognized as a matter requiring the greatest improvement in the artificial neural network operation.

Since artificial neural network operation has characteristics of data intensive processing, the overall operation performance is greatly affected by a bandwidth and latency of a memory device storing data. This is because even when a processor has excellent operation capability, if input data required for operation cannot be retrieved from the memory at an appropriate time, the processor cannot perform actual operation and has to wait in an idle state.

Depending on a type of memory, when the processor transmits a memory address value to read data required for operation from the memory, actually requested data is output from the memory after latency of several clock cycles. In the case of a DRAM, it takes several clocks to activate a word line and a bit line according to a row address, several clocks to activate a column line, and several clocks to pass through a path that transfers data to the outside of the memory. In the case of a NAND flash, as a unit activated at one time is huge, it may take several additional clocks to search for data of a required address.

If the processor does not have data necessary for operation and it takes several clocks to access an external memory of the processor for data read and to actually read it, the operation is stopped because there is no necessary data for that time, which causes the overall operation performance to be degraded.

An object of the present disclosure is to improve the problems of the prior art and is intended to provide a data management device capable of minimizing restrictions in selecting/modifying an artificial neural network by performing artificial neural network processing operations in at least one processor, and capable of broadening the scope of applications. In addition, in an artificial neural network operation system using various memory devices (a DRAM, a SRAM, a Flash Memory and a NVRAM), it is intended to maximize a bandwidth of a given memory by maximizing the latency of reading data from a memory for an artificial neural network operation.

An object of the present disclosure is to provide a data management device capable of supporting an artificial neural network operation at high speed even at an arbitrary location between at least one processor and a memory device.

An object of the present disclosure is to minimize latency associated with data access when a next artificial neural network operation resumes when a processor stops in a state in which an artificial neural network operation is not completed regardless of reasons.

An object of the present disclosure is to provide a data management device that predicts in advance a memory address of data required for a next artificial neural network operation based on a type and characteristics of an artificial neural network operation and responds in advance to a data request required for the next artificial neural network operation.

Conventionally, computing or data operations are performed only by data transfer between a single processor and a single memory device, but due to recent technological developments, computing or operations based on a shared processor or shared memory are being used. At this time, cache coherence between local caches in each processor or memory is emerging as an important issue. In data intensive processing such as artificial neural network operation, this cache coherence is a more important issue.

An object of the present disclosure is not limited to a specific artificial neural network, but to provide cache coherence in an artificial neural network data operation between at least one processor and at least one memory, corresponding to various types or characteristics of various artificial neural networks. In addition, an object of the present disclosure proposes a data management device, a data management method, and a computing system using the method, that are configured such that a configuration for the artificial neural network data operation does not degrade the performance of general data operations except for the artificial neural network data operation.

An object of the present disclosure is to minimize a latency associated with data access when an artificial neural network operation resumes using a device implemented to cope with attempts to improve performance through multiple combinations of various types of artificial neural networks or dynamically deformable networks.

In addition, an object of the present disclosure is to optimize a data management device or data caching memory in response to various types or characteristics of artificial neural networks, and suggests a data management device and a method for supporting an artificial neural network, capable of providing an artificial neural network data operation in which the data caching memory is optimized for artificial neural network operation at run-time.

An object of the present disclosure is to propose a data management device and a method based on a reconfigurable memory capable of effectively supporting an artificial neural network operation by optimizing a hardware setting of a data cache memory corresponding to a type or characteristic of an artificial neural network.

Means for Solving the Problems

The present disclosure is derived as a means for solving the problems of the prior art, and a data management device according to an embodiment of the present disclosure includes a processor interface circuit for receiving an artificial neural network data operation request associated with an artificial neural network operation which is executed by at least one processor; a memory interface circuit for transmitting a memory data operation request based on the artificial neural network data operation request to at least one memory, and receiving memory data in response to the memory data operation request from the at least one memory; and an internal controller for generating the memory data operation request based on the artificial neural network data operation request.

The internal controller identifies a domain and a type of the artificial neural network data operation request based on identification information included in the artificial neural network data operation request, and the internal controller generates data and address order information, that is an order of data of the artificial neural network data operation request associated with the identification information and information of an address in which the data of the artificial neural network data operation request is stored in the order in the at least one memory, and stores the data and address order information in an internal memory.

When receiving a first artificial neural network data operation request, the internal controller generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the internal memory.

The identification information may include information on whether the artificial neural network data operation request is a request for input data for training, a request for a weight assigned to each synapse of an artificial neural network, or a request for an activation parameter, which is an operation result output to output nodes of a next layer from one layer of the artificial neural network, and whether a currently received data request corresponds to the artificial neural network data operation request.

After receiving the first artificial neural network data operation request, the internal controller may predict the second artificial neural network data operation request which is expected to follow the first artificial neural network data operation request based on first identification information included in the first artificial neural network data operation request.

In a state that there is no previous artificial neural network data operation request, after receiving the first artificial neural network data operation request, the internal controller may generate a first memory data operation request including the first address information, and send the first memory data operation request to the memory interface circuit.

After receiving the first artificial neural network data operation request, the internal controller may generate a second memory data operation request including the next address information based on the first artificial neural network data operation and send the second memory data operation request to the memory interface circuit.

At least one of the internal controller or the memory interface circuit may transmit the second memory data operation request to the at least one memory, control the at least one memory so that the at least one memory performs a memory operation corresponding to the second memory data operation request, and receive data corresponding to the second memory data operation request from the at least one memory when the second memory data operation request is a read operation.

At least one of the internal controller or the memory interface circuit may transmit the second memory data operation request to the at least one memory and control the at least one memory so that the at least one memory maintains a ready state capable of performing a memory operation corresponding to the second memory data operation request.

When actually receiving a third artificial neural network data operation request that follows the first artificial neural network data operation request from the at least one processor, the internal controller may check whether third address information with which data of the third artificial neural network data operation request is stored in the at least one memory coincides with the next address information which has been previously generated in the internal controller.

In this case, when the third address information does not coincide with the next address information previously generated in the internal controller, the memory interface circuit may send a third memory data operation request including the third address information to the at least one memory. And the internal controller may update the data-address order information so that the third address information of the third artificial neural network data operation request follows the first address information of the first artificial neural network data operation request, and may store the updated data-address order information in the internal memory.

When using the data and address order information stored in the internal memory, the internal controller may determine adaptive order information used to generate the next address information, based on structure and characteristic information of the artificial neural network associated with the artificial neural network operation, whether the first artificial neural network data operation request is a read request or a write request, and first identification information included in the first artificial neural network data operation request, and first identification information included in the first artificial neural network data operation request, and the internal controller may predict the second artificial neural network data operation request based on the adaptive order information and the data-address order information stored in the internal memory, and generate the next address information. For example, when the first/second artificial neural network data operation request is associated with an operation where an activation parameter is generated and stored, the next address information may be generated in a raster scan order. Alternatively, when the first/second artificial neural network data operation request is associated with an operation of reading a weight of synapse connected to nodes of the next layer, it may be read according to a shape of weight kernel. In this manner, the next address information may be generated based on the adaptive order information according to a type of the artificial neural network data operation request and the associated artificial neural network operation.

The internal controller may generate, as the first address information, information of a current address in which data of the first artificial neural network data operation request is stored in the at least one memory using the data and address order information stored in the internal memory even when the first artificial neural network data operation request does not include an address, based on first identification information included in the first artificial neural network data operation request and whether the first artificial neural network data operation request is a read request or a write request.

The data management device may further include: a read data buffer memory that when the first artificial neural network data operation request is a read request, performs a readahead operation on data which is predicted as the second artificial neural network data operation request from the at least one memory based on the next address information, and then, stores readahead data, which is a result of the readahead operation.

A computing system according to an embodiment of the present disclosure is a computing system having at least one processor and at least one memory and supporting an artificial neural network operation executed by the at least one processor, the computing system comprising: a processor-side interface for receiving an artificial neural network data operation request associated with the artificial neural network operation executed by the at least one processor; a memory-side interface for transmitting a memory data operation request based on the artificial neural network data operation request to the at least one memory, and receiving memory data in response to the memory data operation request from the at least one memory; and a data order memory for storing data and address order information.

The computing system generates the memory data operation request based on the artificial neural network data operation request, the computing system identifies a domain and a type of the artificial neural network data operation request based on identification information included in the artificial neural network data operation request, the computing system generates an order of data of the artificial neural network data operation request associated with the identification information, and information of an address in which the data of the artificial neural network data operation request is stored in the order in the at least one memory, as the data and address order information, and when the processor-side interface receives a first artificial neural network data operation request, the computing system generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

The memory-side interface may transmit the memory data operation request to the at least one memory or at least one external memory outside the computing system, and receive memory data in response to the memory data operation request from the at least one memory or the at least one external memory.

A data management method for supporting an artificial neural network operation according to an embodiment of the present disclosure is a data management method performed in a computing system having at least one processor and at least one memory and supporting an artificial neural network operation executed by the at least one processor, the data management method comprising: receiving an artificial neural network data operation request associated with the artificial neural network operation executed by the at least one processor; transmitting a memory data operation request based on the artificial neural network data operation request to the at least one memory and receiving memory data in response to the memory data operation request from the at least one memory; and generating the memory data operation request based on the artificial neural network data operation request.

The generating of the memory data operation request based on the artificial neural network data operation request may include: identifying a domain and a type of the artificial neural network data operation request based on identification information included in the artificial neural network data operation request; generating information on an order of data of the artificial neural network data operation request associated with the identification information, and an address in which the data of the artificial neural network data operation request is stored in the order in the at least one memory, as the data and address order information; storing the data and address order information in a data order memory inside the computing system; and when receiving a first artificial neural network data operation request, generating, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

A data cache device according to an embodiment of the present disclosure is a data cache device for caching data between at least one processor and at least one memory, the data cache device is a data cache device that supports an artificial neural network operation executed by the at least one processor, and the data cache device may include an internal controller that predicts a next data operation request based on an artificial neural network data locality (ANN data locality) of the artificial neural network operation.

The internal controller of the data cache device may communicate with the at least one memory to perform the next data operation request in advance, and the data cache device may further include a cache memory for storing result data of the next data operation request executed by the at least one memory.

The internal controller of the data cache device may predict the next data operation request based on a current data operation request received from the at least one processor and the artificial neural network data locality.

The internal controller may extract the artificial neural network data locality by monitoring data operation requests associated with the artificial neural network operation among data operation requests that actually made between the at least one processor and the at least one memory.

When the at least one processor transmits a resume data operation request to the at least one memory in order to resume the artificial neural network data operation after a continuous artificial neural network operation between the at least one processor and the at least one memory is stopped, the internal controllers may predict the next data operation request corresponding to the resume data operation request before the resume data operation request is received, based on the continuous artificial neural network operation before being stopped and the artificial neural network data locality, and provide a data operation for the next data operation request to the at least processor without latency.

A data management device according to an embodiment of the present disclosure is a data management device for supporting an artificial neural network operation, the data management device comprising: at least one processor and a reconfigurable memory, wherein by program instructions executed in the at least one processor, the at least one processor analyzes a process to execute an artificial neural network operation and extracts an order pattern of an artificial neural network data operation associated with the artificial neural network operation, wherein by the program instructions, the at least one processor generates artificial neural network memory configuration information based on the order pattern of the artificial neural network data operation, wherein by the program instructions, the at least one processor controls the reconfigurable memory such that the artificial neural network memory configuration information is applied to the reconfigurable memory.

The at least one processor may extract the order pattern based on the artificial neural network data locality (ANN data locality) of the artificial neural network operation.

The at least one processor may extract the order patter, based on whether the artificial neural network data operation request is a request for input data for training, a request for a weight assigned to each synapse of an artificial neural network, or a request for an activation parameter, which is an operation result output to output nodes of a next layer from one layer of the artificial neural network, and whether a currently received data request corresponds to the artificial neural network data operation request.

The at least one processor may extract a run-time order pattern of the artificial neural network data operation, based on structure and characteristic information of an artificial neural network associated with the artificial neural network operation, the order pattern, and whether the first artificial neural network data operation request is a read request or a write request.

A data management device for supporting an artificial neural network operation according to an embodiment of the present disclosure includes: a controller and a reconfigurable memory, wherein by program instructions executed in the controller, the controller receives an order pattern of an artificial neural network data operation associated with the artificial neural network operation obtained based on a process to execute the artificial neural network operation, wherein by the program instructions, the controller generates artificial neural network memory configuration information based on the order pattern of the artificial neural network data operation, wherein by the program instructions, the controller controls the reconfigurable memory such that the artificial neural network memory configuration information is applied to the reconfigurable memory.

The controller may generate the artificial neural network memory configuration information based on physical configuration information of the reconfigurable memory and the order pattern.

The controller may extract a run-time order pattern of the artificial neural network data operation, based on structure and characteristic information of an artificial neural network associated with the artificial neural network operation, the order pattern, and whether the first artificial neural network data operation request is a read request or a write request. In addition, when receiving the artificial neural network operation, the controller may provide the artificial neural network data operation as a response to the artificial neural network operation in cooperation with the reconfigurable memory based on the run-time order pattern.

A data management method for supporting an artificial neural network operation according to an embodiment of the present disclosure is a data management method executed by program instructions executed in at least one processor of a data management device including the at least one processor and a reconfigurable memory, the data management method comprising: according to the program instructions, analyzing a process to execute an artificial neural network operation and extracting an order pattern of an artificial neural network data operation associated with the artificial neural network operation, by the at least one processor; according to the program instructions, generating artificial neural network memory configuration information based on the order pattern of the artificial neural network data operation, by the at least one processor; and according to the program instructions, controlling the reconfigurable memory such that the artificial neural network memory configuration information is applied to the reconfigurable memory, by the at least one processor.

A data management method for supporting an artificial neural network operation according to an embodiment of the present disclosure is a data management method that is performed by program instructions executed in a controller of a data management device including the controller and a reconfigurable memory and supporting an artificial neural network operation, the data management method comprising: according to the program instructions, receiving an order pattern of an artificial neural network data operation associated with the artificial neural network operation obtained based on a process to execute the artificial neural network operation, by the controller; according to the program instructions, generating artificial neural network memory configuration information based on the order pattern of the artificial neural network data operation, by the controller; and according to the program instructions, controlling the reconfigurable memory such that the artificial neural network memory configuration information is applied to the reconfigurable memory, by the controller.

Effects of the Present Disclosure

According to the present disclosure, even when an existing processor and an existing memory are used, a latency occurring while the processor reading data from the memory can be removed or minimized in case of resuming an artificial neural network operation that has been interrupted.

According to the present disclosure, a delay time for obtaining data for an artificial neural network operation by a processor and an operation idle period can be minimized, and a bandwidth of an existing memory can be maximized.

According to the present disclosure, it is possible to optimize/maximize the overall operation performance of an artificial neural network computing system.

According to the present disclosure, there is provided a data management device and a method capable of supporting an artificial neural network operation at a high speed at an arbitrary location between at least one processor and at least one memory device. In addition, it is possible to provide a computing system in which such a data management method is performed.

According to the present disclosure, without being limited to a specific artificial neural network, cache coherence can be provided in an artificial neural network data operation between at least one processor and at least one memory corresponding to various types or characteristics of various artificial neural networks. In addition, it is possible to provide a data management device, a data management method, and a computing system using the method, that are configured such that a configuration for the artificial neural network data operation does not degrade the performance of general data operations except for the artificial neural network data operation.

According to the present disclosure, a latency associated with data access when an artificial neural network operation is resumed is minimized by using a device implemented to cope with attempts to improve performance through multiple combinations of various types of artificial neural networks or dynamically deformable networks.

According to the present disclosure, a data management device or a data caching memory can be optimized in response to various types or characteristics of artificial neural networks, and an artificial neural network data operation in which the data caching memory is optimized for artificial neural network operation at run-time can be provided.

According to the present disclosure, it is possible to provide a reconfigurable memory capable of effectively supporting an artificial neural network operation by optimizing a hardware setting of a data cache memory corresponding to a type or characteristic of an artificial neural network.

BEST MODE FOR CARRYING OUT THE INVENTION

Figure 1:
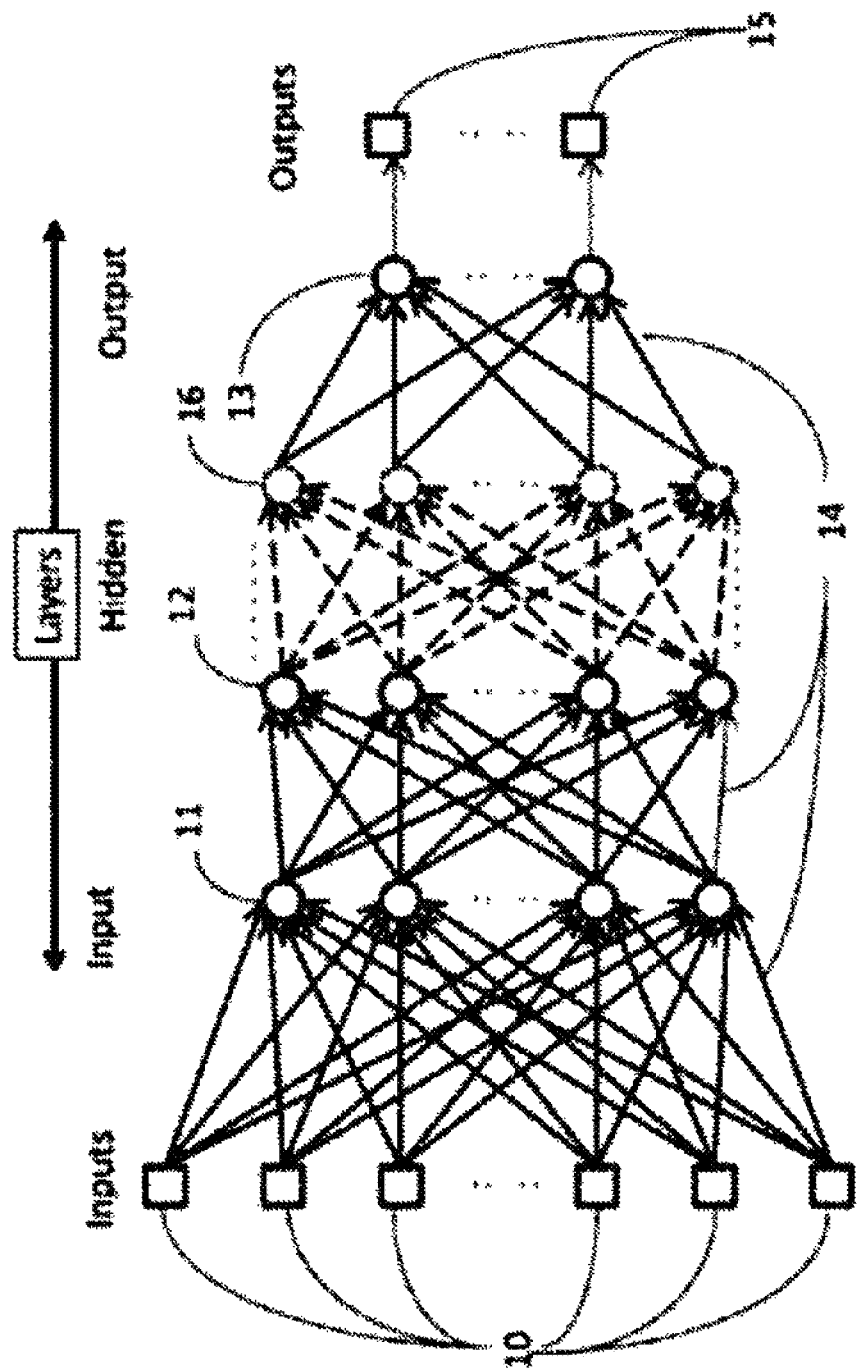
FIG. 1 is a diagram illustrating a structure and operation of an example of a general artificial neural network.

The present disclosure is derived as a means for solving the problems of the prior art, and a data management device according to an embodiment of the present disclosure includes a processor interface circuit for receiving an artificial neural network data operation request associated with an artificial neural network operation which is executed by at least one processor; a memory interface circuit for transmitting a memory data operation request based on the artificial neural network data operation request to at least one memory, and receiving memory data in response to the memory data operation request from the at least one memory; and an internal controller for generating the memory data operation request based on the artificial neural network data operation request.

The internal controller identifies a domain and a type of the artificial neural network data operation request based on identification information included in the artificial neural network data operation request, and the internal controller generates data and address order information, that is an order of data of the artificial neural network data operation request associated with the identification information and information of an address in which the data of the artificial neural network data operation request is stored in the order in the at least one memory, and stores the data and address order information in an internal memory.

When receiving a first artificial neural network data operation request, the internal controller generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the internal memory.

The identification information may include information on whether the artificial neural network data operation request is a request for input data for training, a request for a weight assigned to each synapse of an artificial neural network, or a request for an activation parameter, which is an operation result output to output nodes of a next layer from one layer of the artificial neural network, and whether a currently received data request corresponds to the artificial neural network data operation request.

After receiving the first artificial neural network data operation request, the internal controller may predict the second artificial neural network data operation request which is expected to follow the first artificial neural network data operation request based on first identification information included in the first artificial neural network data operation request.

In a state that there is no previous artificial neural network data operation request, after receiving the first artificial neural network data operation request, the internal controller may generate a first memory data operation request including the first address information, and send the first memory data operation request to the memory interface circuit.

After receiving the first artificial neural network data operation request, the internal controller may generate a second memory data operation request including the next address information based on the first artificial neural network data operation and send the second memory data operation request to the memory interface circuit.

At least one of the internal controller or the memory interface circuit may transmit the second memory data operation request to the at least one memory, control the at least one memory so that the at least one memory performs a memory operation corresponding to the second memory data operation request, and receive data corresponding to the second memory data operation request from the at least one memory when the second memory data operation request is a read operation.

At least one of the internal controller or the memory interface circuit may transmit the second memory data operation request to the at least one memory and control the at least one memory so that the at least one memory maintains a ready state capable of performing a memory operation corresponding to the second memory data operation request.

When actually receiving a third artificial neural network data operation request that follows the first artificial neural network data operation request from the at least one processor, the internal controller may check whether third address information with which data of the third artificial neural network data operation request is stored in the at least one memory coincides with the next address information which has been previously generated in the internal controller.

In this case, when the third address information does not coincide with the next address information previously generated in the internal controller, the memory interface circuit may send a third memory data operation request including the third address information to the at least one memory. And the internal controller may update the data-address order information so that the third address information of the third artificial neural network data operation request follows the first address information of the first artificial neural network data operation request, and may store the updated data-address order information in the internal memory.

When using the data and address order information stored in the internal memory, the internal controller may determine adaptive order information used to generate the next address information, based on structure and characteristic information of the artificial neural network associated with the artificial neural network operation, whether the first artificial neural network data operation request is a read request or a write request, and first identification information included in the first artificial neural network data operation request, and first identification information included in the first artificial neural network data operation request, and the internal controller may predict the second artificial neural network data operation request based on the adaptive order information and the data-address order information stored in the internal memory, and generate the next address information. For example, when the first/second artificial neural network data operation request is associated with an operation where an activation parameter is generated and stored, the next address information may be generated in a raster scan order. Alternatively, when the first/second artificial neural network data operation request is associated with an operation of reading a weight of synapse connected to nodes of the next layer, it may be read according to a shape of weight kernel. In this manner, the next address information may be generated based on the adaptive order information according to a type of the artificial neural network data operation request and the associated artificial neural network operation.

The internal controller may generate, as the first address information, information of a current address in which data of the first artificial neural network data operation request is stored in the at least one memory using the data and address order information stored in the internal memory even when the first artificial neural network data operation request does not include an address, based on first identification information included in the first artificial neural network data operation request and whether the first artificial neural network data operation request is a read request or a write request.

The data management device of the present disclosure may further include: a read data buffer memory that when the first artificial neural network data operation request is a read request, performs a readahead operation on data which is predicted as the second artificial neural network data operation request from the at least one memory based on the next address information, and then, stores readahead data, which is a result of the readahead operation.

A computing system according to an embodiment of the present disclosure is a computing system having at least one processor and at least one memory and supporting an artificial neural network operation executed by the at least one processor, the computing system comprising: a processor-side interface for receiving an artificial neural network data operation request associated with the artificial neural network operation executed by the at least one processor; a memory-side interface for transmitting a memory data operation request based on the artificial neural network data operation request to the at least one memory, and receiving memory data in response to the memory data operation request from the at least one memory; and a data order memory for storing data and address order information.

The computing system generates the memory data operation request based on the artificial neural network data operation request, the computing system identifies a domain and a type of the artificial neural network data operation request based on identification information included in the artificial neural network data operation request, the computing system generates an order of data of the artificial neural network data operation request associated with the identification information, and information of an address in which the data of the artificial neural network data operation request is stored in the order in the at least one memory, as the data and address order information, and when the processor-side interface receives a first artificial neural network data operation request, the computing system generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

The memory-side interface may transmit the memory data operation request to the at least one memory or at least one external memory outside the computing system, and receive memory data in response to the memory data operation request from the at least one memory or the at least one external memory.

A data management method for supporting an artificial neural network operation according to an embodiment of the present disclosure is a data management method performed in a computing system having at least one processor and at least one memory and supporting an artificial neural network operation executed by the at least one processor, the data management method comprising: receiving an artificial neural network data operation request associated with the artificial neural network operation executed by the at least one processor; transmitting a memory data operation request based on the artificial neural network data operation request to the at least one memory and receiving memory data in response to the memory data operation request from the at least one memory; and generating the memory data operation request based on the artificial neural network data operation request.

The generating of the memory data operation request based on the artificial neural network data operation request may include: identifying a domain and a type of the artificial neural network data operation request based on identification information included in the artificial neural network data operation request; generating information on an order of data of the artificial neural network data operation request associated with the identification information, and an address in which the data of the artificial neural network data operation request is stored in the order in the at least one memory, as the data and address order information; storing the data and address order information in a data order memory inside the computing system; and when receiving a first artificial neural network data operation request, generating, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

A data cache device according to an embodiment of the present disclosure is a data cache device for caching data between at least one processor and at least one memory, the data cache device is a data cache device that supports an artificial neural network operation executed by the at least one processor, and the data cache device may include an internal controller that predicts a next data operation request based on an artificial neural network data locality (ANN data locality) of the artificial neural network data operation.

The internal controller of the data cache device may communicate with the at least one memory to perform the next data operation request in advance, and the data cache device may further include a cache memory for storing result data of the next data operation request executed by the at least one memory.

The internal controller of the data cache device may predict the next data operation request based on a current data operation request received from the at least one processor and the artificial neural network data locality.

The internal controller may extract the artificial neural network data locality by monitoring data operation requests associated with the artificial neural network operation among data operation requests that actually made between the at least one processor and the at least one memory.

When the at least one processor transmits a resume data operation request to the at least one memory in order to resume the artificial neural network data operation after a continuous artificial neural network operation between the at least one processor and the at least one memory is stopped, the internal controllers may predict the next data operation request corresponding to the resume data operation request before the resume data operation request is received, based on the continuous artificial neural network operation before being stopped and the artificial neural network data locality, and provide a data operation for the next data operation request to the at least processor without latency.

A data management device according to an embodiment of the present disclosure is a data management device for supporting an artificial neural network operation, the data management device comprising: at least one processor and a reconfigurable memory, wherein by program instructions executed in the at least one processor, the at least one processor analyzes a process to execute an artificial neural network operation and extracts an order pattern of an artificial neural network data operation associated with the artificial neural network operation, wherein by the program instructions, the at least one processor generates artificial neural network memory configuration information based on the order pattern of the artificial neural network data operation, wherein by the program instructions, the at least one processor controls the reconfigurable memory such that the artificial neural network memory configuration information is applied to the reconfigurable memory.

The at least one processor may extract the order pattern based on the artificial neural network data locality (ANN data locality) of the artificial neural network operation.

The at least one processor may extract the order patter, based on whether the artificial neural network data operation request is a request for input data for training, a request for a weight assigned to each synapse of an artificial neural network, or a request for an activation parameter, which is an operation result output to output nodes of a next layer from one layer of the artificial neural network, and whether a currently received data request corresponds to the artificial neural network data operation request.

The at least one processor may extract a run-time order pattern of the artificial neural network data operation, based on structure and characteristic information of an artificial neural network associated with the artificial neural network operation, the order pattern, and whether the first artificial neural network data operation request is a read request or a write request.

A data management device for supporting an artificial neural network operation according to an embodiment of the present disclosure includes: a controller and a reconfigurable memory, wherein by program instructions executed in the controller, the controller receives an order pattern of an artificial neural network data operation associated with the artificial neural network operation obtained based on a process to execute the artificial neural network operation, wherein by the program instructions, the controller generates artificial neural network memory configuration information based on the order pattern of the artificial neural network data operation, wherein by the program instructions, the controller controls the reconfigurable memory such that the artificial neural network memory configuration information is applied to the reconfigurable memory.

The controller may generate the artificial neural network memory configuration information based on physical configuration information of the reconfigurable memory and the order pattern.

The controller may extract a run-time order pattern of the artificial neural network data operation, based on structure and characteristic information of an artificial neural network associated with the artificial neural network operation, the order pattern, and whether the first artificial neural network data operation request is a read request or a write request. In addition, when receiving the artificial neural network operation, the controller may provide the artificial neural network data operation as a response to the artificial neural network operation in cooperation with the reconfigurable memory based on the run-time order pattern.

A data management method for supporting an artificial neural network operation according to an embodiment of the present disclosure is a data management method executed by program instructions executed in at least one processor of a data management device including the at least one processor and a reconfigurable memory, the data management method comprising: according to the program instructions, analyzing a process to execute an artificial neural network operation and extracting an order pattern of an artificial neural network data operation associated with the artificial neural network operation, by the at least one processor; according to the program instructions, generating artificial neural network memory configuration information based on the order pattern of the artificial neural network data operation, by the at least one processor; and according to the program instructions, controlling the reconfigurable memory such that the artificial neural network memory configuration information is applied to the reconfigurable memory, by the at least one processor.

A data management method for supporting an artificial neural network operation according to an embodiment of the present disclosure is a data management method that is performed by program instructions executed in a controller of a data management device including the controller and a reconfigurable memory and supporting an artificial neural network operation, the data management method comprising: according to the program instructions, receiving an order pattern of an artificial neural network data operation associated with the artificial neural network operation obtained based on a process to execute the artificial neural network operation, by the controller; according to the program instructions, generating artificial neural network memory configuration information based on the order pattern of the artificial neural network data operation, by the controller; and according to the program instructions, controlling the reconfigurable memory such that the artificial neural network memory configuration information is applied to the reconfigurable memory, by the controller.

MODE FOR CARRYING OUT THE INVENTION

Besides objects described above, other objects and features of the present disclosure will become apparent through descriptions of embodiments with reference to the accompanying drawings.

Here, preferred embodiments of the present disclosure will be described in detail with reference to the accompanying drawings. In the following description of the present disclosure, a detailed description of known functions and configurations incorporated herein will be omitted when it may make the subject matter of the present disclosure rather unclear.

FIG. 1 is a diagram illustrating a structure and operation of an example of a general artificial neural network. A portion or entirety of a configuration of the artificial neural network of FIG. 1 may be included as a part of the present disclosure as necessary for specific implementation of the present disclosure.

In addition, a method in which a processor accesses a memory in a data operation process associated with the artificial neural network of FIG. 1 may be included as a part of the present disclosure for a specific implementation of the present disclosure.

Referring to FIG. 1, an example of a convolutional neural network (CNN) including hidden layers is shown. A plurality of input values 10 are transmitted to a plurality of input nodes 11. Values of the respective input nodes 11 are multiplied by respective weights 14 and transmitted to nodes of next layers. For example, a weighted sum of the values output from the input nodes 11 may be normalized and transmitted to hidden nodes 12 of hidden layers. Values calculated through multiple hidden layers are transmitted to the hidden nodes 16 of the last hidden layer. Values of the nodes 16 of the last hidden layer are multiplied by the weights 14 and transferred to output nodes 13, and the output nodes 13 finally provide output values 15 as final results of the artificial neural network.

Deep learning/CNN-based artificial neural network technology, which has been rapidly developed in recent years, leads to superior performance than existing rule-based pattern recognition technology in various fields such as pattern analysis in images, comparison between images, and pattern analysis in audio/text. Artificial neural network technology of recognizing and detecting patterns that are difficult for human eyes and ears to distinguish is expected to be expanded to various fields such as security, medical imaging, and non-destructive testing.

When the artificial neural network is trained based on the input values 10, weights 14 meaning relationship between data corresponding to the nodes 11, 12, 13, 16 of respective layers, and the respective nodes are changed by an object function not shown in FIG. 1. At this time, the weights 14 and the data corresponding to the nodes 11, 12, 13, 16 of the respective layers are read from a memory by a processor during a training process, and the data changed by an operation is overwritten in the memory.

Data required in a training process of an artificial neural network is classified into input data for training, weight data (associated parameter), and an activation parameter (feature map). The input data for training may be an image, audio, vibration data, or the like. For example, in the case of an image, a pixel value is input to the artificial neural network as the input values 10 of FIG. 1. The input values 10 are stored once in the memory during the training process of the artificial neural network, and then, read repeatedly tens to hundreds of times and used in the training process. The input values 10 are read tens to hundreds of times in the order in which they are initially stored in the memory.

The weight data is a combination of weight values assigned to respective synapses of the artificial neural network. As shown in the weight 14 of FIG. 1, it is an associated parameter indicating relationship between respective nodes. In the training process of the artificial neural network, the weight data should be read from the memory for progression from one layer to the next layer, and in some cases, the weight data should be modified, and the modified weight data should be overwritten in the memory. The training process of the artificial neural network repeats a process of performing necessary operations by reading a series of pieces of learning data and overall weight data included in an artificial neural network model and as a result, generating a modified weight value. The training process is performed on all learning data, and weights are modified through repetitive operations ranging from tens to hundreds of times for one of learning data sets. An order of overwriting weight values in the training process of a series of learning data is an order in which the weight values are initially are stored in a writing operation of the weight values, and an order of reading the weight values is based on an order in which the weight values were initially written in a writing operation or an order in which weight values modified in a previous training procedure are overwritten.

The activation parameter is calculation result data that is output to nodes of a next layer from one layer of the artificial neural network. To calculate the next layer of a corresponding layer, feature map data of the corresponding layer is read and a value of the next layer is calculated. If such activation parameters/feature maps are stored in the memory in an order of creating them and read for next layer operations, a reading order will be determined based on at least the order of storing them in the memory. In most cases, activation parameters/feature maps are generated in one layer, and roles thereof end when input to the next layer. In FIG. 1, when values of the nodes 11 are multiplied by the weights 14 and transferred to the nodes 12, generally, the values of the nodes 11 are rarely used in the subsequent process, and it can be seen that the roles thereof end. However, depending on an application and purpose, there is a case in which changes in values of the nodes of respective layers are monitored (in case of searching for an operation inside the artificial neural network). In this case, the values of the nodes of the respective layers are also stored in the memory.

When training of the artificial neural network is terminated, if new input values 10 are given, the artificial neural network infers new input values 10 as a result of training by applying fixed weights 14 and provides output values 15.

In an inference process of the artificial neural network, new input values 10 are read from the memory, and the weights 14 are also read sequentially from the memory. Unlike the training process, since the weight 14 does not change in the inference process, an overwrite process of the weight 14 is not necessary. The activation parameters of the respective nodes generally end their role after operations of a corresponding layer thereof, and are rarely used thereafter.

Feature map data of respective nodes generally ends its role after operations of a corresponding layer thereof, but recently, attempts have been made to analyze actions within an artificial neural network. Depending on an application and purpose, there is a case in which feature map data of respective nodes should be stored in the memory. In this case, feature map data of respective nodes may be stored in the memory at the request of the processor.

In the inference process of the artificial neural network, since a weight value is fixed, no overwriting operation is required, and data which is initially stored in the memory is read as it is. At this time, an order of a read operation will be determined based on an order of a write operation or may be applied by partially changing the order of the write operation, and the order of the write operation is applied equally to a next inference process.

For the activation parameter/feature map, data is generated by layer and stored in the memory in the inference process and when it is used as input in the next layer, it's role in the inference process ends. In most cases, the activation parameters/feature maps are read in an order in which pieces of data are first stored in the memory during the inference process.

Although a convolutional neural network is mainly illustrated in FIG. 1, the present disclosure is not limited to a convolutional neural network, and may be applied to cases of using arbitrary artificial neural network (ANN) other than a convolutional neural network.

The disclosures of prior documents mentioned above, for example, KR 10-2019-018888, US 2019/0057302, U.S. Pat. No. 9,805,304, US 2019/0057300, U.S. Pat. No. 9,836,691 and the like, may be included as a part of a configuration of the present disclosure if necessary for implementation, within the scope of the purpose of the present disclosure.

Figure 2:
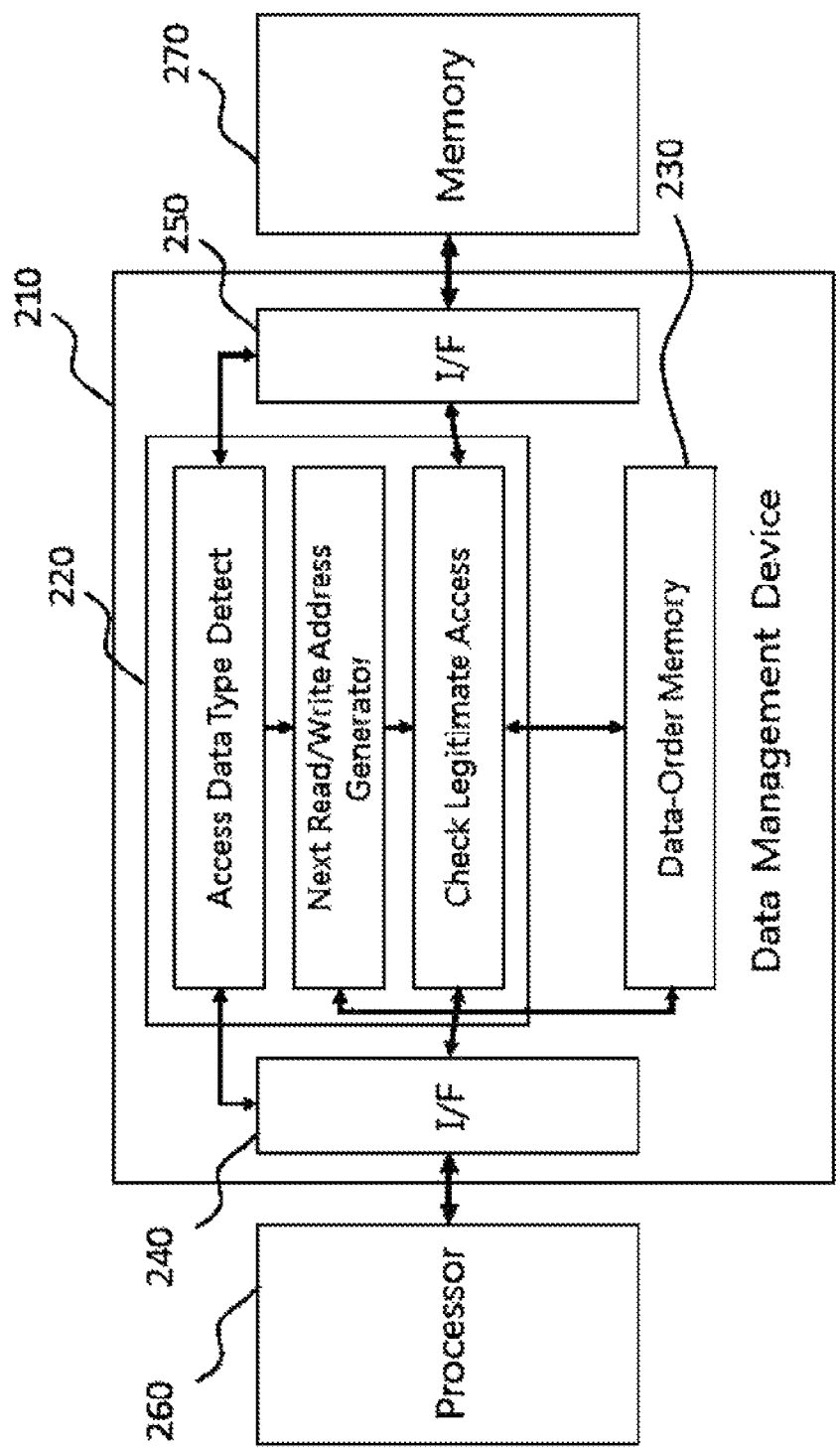
FIG. 2 is a diagram illustrating a data management device for supporting a high speed artificial neural network operation according to an embodiment of the present disclosure.

FIG. 2 is a diagram illustrating a data management device 210 for supporting a high speed artificial neural network operation according to an embodiment of the present disclosure.

At least one processor 260 shown in FIG. 2 performs an artificial neural network operation alone or in cooperation with another processor, and reads data associated with an artificial neural network operation from at least one memory 270 or stores data associated with an artificial neural network operation in at least one memory 270. In this case, a read or write request for at least one memory 270 as data associated with an artificial neural network operation will be referred to as an artificial neural network data operation request. The artificial neural network data operation request may mean data which is requested from the memory 270 by the processor 260 in association with the artificial neural network operation, or may mean data which is required to be stored in the memory 270 by the processor 260. The artificial neural network data operation request includes information on at least one of a data field or an address field according to whether a read request or write requests are made.

The at least one processor 260 may be implemented with any type of processor capable of performing artificial neural network computation. For example, it may include all types of processors customized for artificial neural network computation, as well as a general CPU, a GPU focused on graphics processing, and a neural network processor (NNP) focused on artificial neural network computation.

The data management device 210 of the present disclosure includes an internal controller 220, a processor-side interface circuit 240, and a memory-side interface circuit 250.

The processor-side interface circuit 240 receives an artificial neural network data operation request from at least one processor 260. The memory-side interface circuit 250 transmits a memory data operation request based on the artificial neural network data operation request to at least one memory 270 and receives memory data responding to the memory data operation request from the at least one memory 270.

The internal controller 220 generates the memory data operation request based on the artificial neural network data operation request.

The internal controller 220 may include an access data type detect submodule that identifies a domain and a type of the artificial neural network data operation request based on identification information/channel information included in the artificial neural network data operation request. At this time, the type of artificial neural network data operation request may be distinguished based on identification information/channel information. The type of artificial neural network data operation request means a type of data designated as an object of a data operation requested in the memory, and may correspond to any one of input data, weight data, or activation parameters (feature maps) in an artificial neural network. Also, depending on whether the operation request is read or write, future predictions and responses may be varied.

The internal controller 220 may monitor, track or observe an order of data of the artificial neural network data operation request associated with the identification information/channel information, and information of an address in which the data of the artificial neural network data operation request is stored in the order in the at least one memory, and in this case, the internal controller 220 generates the monitored, tracked and observed address information as data and address order information, and stores the data and address order information in a data order memory 230, which is an internal memory.

The data order memory 230 is a memory located inside the data management device 210 and is distinguished from at least one memory 270 located outside the data management device 210. The data order memory 230 is shown in FIG. 2 as being located outside the internal controller 220, but according to another embodiment, the data order memory 230 may be located inside the internal controller 220.

When receiving a first artificial neural network data operation request, a next read/write address generator submodule of the internal controller 220 may generate as next information, information of a second address in which data of a second artificial neural network data operation request that follows the first artificial neural network data operation request is stored in the at least one memory 270 based on information of a first address in which data of the first artificial neural network data operation request is stored in the at least one memory 270, and the data and address order information stored in the data order memory 230, which is the internal memory. When receiving an N-th artificial neural network data operation request, the internal controller 220 may predict and generate information of a (N+1)th address in which data of a (N+1)th artificial neural network data operation request following an N-th artificial neural network data operation request is stored in the at least one memory 270 based on information of an N-th address in which data of the N-th artificial neural network data operation request is stored in at least one memory 270, and the data and address order information stored in the data order memory 230, which is the internal memory.

When the internal controller 220 predicts the second artificial neural network data operation request to be performed next and generates next address information based on a first artificial neural network data operation request which has been currently received, the internal controller 220 may refer to identification information/channel information included in the first artificial neural network data operation request. As described above, the internal controller 220 monitors, tracks or observes an order of data of an artificial neural network data operation request associated with identification information/channel information, and information of an address in which the data of the artificial neural network data operation request is stored in at least one memory in the order, and at this time, the internal controller 220 may generate the monitored, tracked, or observed address information as the data and address order information. The internal controller 220 may predict the second artificial neural network data operation request to be performed next and generate next address information, based on the data and address order information obtained as a result of monitoring, tracking, or observation and the first artificial neural network data operation request which has been currently received.

The identification information/channel information may include information on whether the artificial neural network data operation request is a request for input data for training, a request for a weight assigned to each synapse of an artificial neural network, or a request for an activation parameter, which is an operation result output to output nodes of the next layer from one layer of the artificial neural network, and whether a currently received data request corresponds to the artificial neural network data operation request.

The identification information/channel information may be expressed by an identification code/channel code. A domain of artificial neural network data classified by the identification code may be classified into input data for training, weight data (associated parameter), and an activation parameter (feature map).

In addition, the identification code may indicate whether a data operation request is an artificial neural network data operation by designating a case in which the data operation request currently received from the processor 260 is not associated with the artificial neural network operation as a separate state value.

After receiving the first artificial neural network data operation request, the internal controller 220 may predict a second artificial neural network data operation request which is expected to follow the first artificial neural network data operation request based on first identification information included in the first artificial neural network data operation request. That is, the internal controller may predict the second artificial neural network data operation request to be performed next, according to a type of the first artificial neural network data operation request. In this case, the prediction of the second artificial neural network data operation request may include a prediction of whether the request is for read or write, and may include a prediction of an address of a memory where data will be stored or has been already stored.

The data and address order information stored in the data order memory 230, which is an internal memory, may be first generated (initialized) when data of a write request is sequentially stored in at least one memory 270 after the processor-side interface circuit 240 receives a write request of data necessary for an artificial neural network operation from at least one processor 260 and transmits it to at least one memory 270 via the memory-side interface circuit 250. The order of data of write requests, and information of the address in which data of write requests is stored in at least one memory 270 in the order are generated as the data and address order information. The simplest example may be a table in which data of write requests and addresses in at least one memory 270 corresponding thereto are sequentially described. The data of the write requests may be divided into units such as bytes, words, sectors, pages, and blocks, and addresses in at least one memory 270 corresponding to each of the divided units may be sequentially stored in the table. The data order memory 230, which is an internal memory, may store the table.

If address information on respective pieces of data of the write request is stored in a table in this manner, a size of the table will be excessively large, so the table may be compressed as needed. That is, consecutive data of write requests is expressed only by a start address and an end address, and data in between may be regarded as being sequentially stored between the start address and the end address.

The data and address order information stored in the data order memory 230 may include at least part of information of a physical-logical address mapping table or a flash translation layer (FTL) when at least one memory 270 is a nonvolatile memory such as a flash memory. When a configuration of at least one memory 270 is changed, the at least one memory 270 transmits information on the changed configuration to the data management device 210, and the internal controller 220 of the data management device 210 may update the data and address order information based on the information on the changed configuration and store updated data and address order information in the data order memory 230.

Even when a configuration of an artificial neural network recognized by at least one processor 260 is changed, the internal controller 220 of the data management device 210 may update data and address order information necessary for an artificial neural network operation based on the changed configuration of the artificial neural network. Address order information can be updated. For example, in the case of applying a dynamically changed artificial neural network technique, at least one processor 260 started an artificial neural network operation, assuming an artificial neural network with 100 hidden layers, but the policy can be changed to perform the artificial neural network operation with only 70 hidden layers. In this case, at least one processor 260 may transmit a dynamically changed configuration of the artificial neural network to the data management device 210. However, in general, at least one processor 260 may transmit an artificial neural network data operation request to the data management device 210 without notifying the dynamically changed configuration of the artificial neural network. In this case, the data management device 210 may figure out that the configuration of the artificial neural network has changed by monitoring information of an address in at least one memory 270 where artificial neural network data operation requests received from the at least one processor 260 sequentially access. The internal controller 220 of the data management device 210 may detect a change in the configuration of the artificial neural network even when the at least one processor 260 notifies or does not notify the dynamically changed configuration of the artificial neural network, and update the data and address order information stored in the data order memory 230.

The data and address order information is first generated (initialized) in a process of processing a data write request associated with an artificial neural network operation, and the internal controller 220 in the data management device 210 may be used to predict data of the next artificial neural network data operation request and its address, in a process in which at least one processor 260 requests to read data stored in at least one memory 270.

For example, image data may be used as input data necessary for training of an artificial neural network. The image data may be expressed as a brightness value by color of each pixel. Pieces of information of respective pixels are sequentially stored in at least one memory 270 when write requests are made, and have a high possibility of being called from at least one memory 270 at the time of read requests in the same order as the order of write requests. In addition, feature maps or activation parameters of each layer are also sequentially stored in at least one memory 270 when write requests are made, and even when read requests are made, they may a high possibility of being called from at least one memory 270 in the same order as the order of write requests.

Meanwhile, even in the case of weight 14 data shown in the artificial neural network of FIG. 1, data and address order information generated at the time of write requests may be used when read requests are made. However, an order of the weight 14 data when write requests are made may not be identical to the order of the weight 14 data when read request are made. Since there is a possibility that when write requests are made, the weight 14 data may be stored in an order of nodes of a previous layer, and when read requests are made, the weight 14 data may be called in an order of nodes of a next layer, the internal controller 220 inside the data management device 210 may predict the next data operation request by identifying a type and characteristic of the artificial neural network data operation request. Even in the case, the internal controller 220 may predict the next data operation request based on data and address order information which has been previously stored in the data order memory 230. The internal controller 220 may distinguish whether a corresponding artificial neural network data operation request is read/write, a training process/inference process or the like by using the identification code/channel code included in the artificial neural network data operation request, and predict the next data operation request based on data and address order information according to a distinguished type and characteristic of the artificial neural network data operation request.

Meanwhile, for data that may have different orders of being called when write requests are made and when read requests are made, like the weight 14 data, addresses within at least one memory 270 may be allocated in consideration of factors affecting the orders from the time of storage in at least one memory 270. For example, at least a portion of addresses in at least one memory 270 may be generated by combining the order of nodes of a previous layer and the order of nodes of a next layer with which the weight is associated. In this case, the internal controller 220 may generate and manage separate data and address order information by assuming the orders when write requests are made and when read requests are made, respectively.

The internal controller 220 receives the first artificial neural network data operation request in a state in which there is no previous artificial neural network data operation request, and then, may generate a first memory data operation request including the first address information of the first artificial neural network data operation request and transmit the first memory data operation request to the memory-side interface circuit 250. That is, when write requests associated with an artificial neural network operation are initiated in a case where there is no previously stored data, the data management device 210 may transmit each write request (including data and an address) to at least one memory 270. At this time, mapping information between the data and the address of the write request is first generated (initialized) as data and address order information, and the first generated (initialized) data and address order information is stored in the data order memory 230.

After receiving the first artificial neural network data operation request, the internal controller 220 may generate a second memory data operation request including the next address information based on the first artificial neural network data operation, and transmit the second memory data operation request to the memory interface circuit. That is, in a state in which data and address order information is first generated (initialized) by a write request, when a read request or rewrite request associated with an artificial neural network operation for stored data is received, the internal controller 220 may predict the second artificial neural network data operation request even before the next second artificial neural network data operation request is received, based on the first artificial neural network data operation request which has been currently received on the basis of the data and address order information. As described above, such prediction may be implemented using characteristics in which the artificial neural network data operation is generally a data intensive operation and accesses the next data with a certain rule.

In a state in which the internal controller 220 receives sequential artificial neural network data operation requests based on an artificial neural network operation from at least one processor 260, if the next artificial neural network data operation request is delayed or not received for various reasons, the internal controller 220 may predict the next artificial neural network data operation request based on the artificial neural network data operation requests that have been received so far, and send actions necessary therefor to at least one memory 270. At this time, what sent to at least one memory 270 is the next artificial neural network data operation request predicted by the internal controller 220, and data and addresses may be selected by the internal controller 220 and transmitted to at least one memory 270. The at least one memory 270 may maintain a ready state to perform a memory operation based on the next artificial neural network data operation request predicted by the internal controller 220 or may output data by performing a memory operation. If a next read request is not received while sequential read requests are being conducted in connection with the artificial neural network operation request, a next read request predicted by the internal controller 220 is transmitted to at least one memory 270, and the at least one memory 270 may perform a memory operation based on the next read request, and read data of the next read request and provide it to the data management device 270 in advance, even before the next read request reaches the data management device 210 from the processor 260. Thereafter, when the processor 260 resumes an operation or obstacles to delaying a read request are removed, so a next read request from the processor 260 is received by the data management device 270, the data management device 210 may promptly transmit data of the next read request which is provided beforehand from the memory 270, to the processor 260 without latency or penalty.

That is, if a read request from the processor 260 is stopped for a time longer than a normal delay time, the memory 270 has a high possibility of entering another memory operation. So, in the prior arts, when a next read request is transmitted from the processor 260 later, the memory 270 needs to reperform a preparation operation from its beginning in order to perform the next read request after a read request has stopped and resumed. Latency or penalty incurred in this process can be a factor of lowering a speed of artificial neural network data operations. The data management device 210 according to the present disclosure can promptly provide the data of the next read request, which is prepared in advance, to the processor 260 when the read request from the processor 260 is resumed after being stopped, so that it can make or minimize latency or penalty which is recognized by the processor 260 to zero. While the data management device 210 transmits the data of the next read request, which is provided in advance, to the processor 260, it may send sequential read requests to the memory 270 so that the memory 270 can respond to the sequential read requests following the next read request. Accordingly, the memory 270 can perform a subsequent memory operation without latency or penalty. When a first artificial neural network data operation request (A) is received, the internal controller 220 not only transmits it to the memory 270 so that a first artificial neural network data operation (A) is performed without disruption, but may also predict a second artificial neural network data operation request (B') following the first artificial neural network data operation (A), transfer the predicted second artificial neural network data operation request (B') to the memory 270, and then, receive result data of the second artificial neural network data operation request (B') in advance from the memory 270.

Thereafter, when a third artificial neural network data operation request (B) that actually follows the first artificial neural network data operation request (A) is received from the processor 260, if the third artificial neural network data operation request (B) and the predicted second artificial neural network data operation request (B') are identical to each other, the data management device 210 transmits the result data of the second artificial neural network data operation request (B'), which is previously received from the memory 270, to the processor 260, so that latency or penalty can be minimized. The internal controller 220 may predict a fourth artificial neural network data operation request (C') to be followed next based on the actually received third artificial neural network data operation request (B), transfer the fourth artificial neural network data operation request (C') to the memory 270, and then, receive result data of the fourth artificial neural network data operation request (C') in advance, from the memory 270.

Even if a data request associated with the artificial neural network operation request is stopped or delayed after the first artificial neural network data operation request (A), and the third artificial neural network data operation request (B) is resumed after a longer period of time has elapsed, the data management device 210 according to the present disclosure can transmit the result data of the second artificial neural network data operation request B', which is prepared in advance, to the processor 260, thereby minimizing latency or penalty. In addition, the internal controller 220 may predict the fourth artificial neural network data operation request (C') to be followed based on the actually received third artificial neural network data operation request (B), transfer the fourth artificial neural network data operation request (C') to the memory 270, and then, receive the result data of the fourth artificial neural network data operation request (C') in advance, from the memory 270, so that the memory 270 can be controlled to promptly perform a next data operation. This allows a resumed data operation to be promptly conducted without latency or penalty.

When a check legitimate access submodule of the internal controller 220 actually receives the third artificial neural network data operation request (B) that follows the first artificial neural network data operation request (A) from at least one processor 260, it may check whether the third address information with which data of the artificial neural network data operation request (B) is stored in at least one memory 270 coincides with address information of the second artificial neural network data operation request (B') which has been previously generated/predicted as next address information in the internal controller 220.

At this time, if the third address information does not coincide with the address information of the second artificial neural network data operation request (B') which has been previously generated/predicted as the next address information in the internal controller 220, the memory-side interface circuit 250 may transmit a third memory data operation request (B) including third address information to at least one memory 270, and the internal controller 220 may update data and address order information so that the third address information of the third artificial neural network data operation request B follows next to the first address information of the first artificial neural network data operation request (A), and store the updated data and address order information in the data order memory 230, which is an internal memory.

In this manner, when the processor 260 performs read accesses in an unexpected order, since the data management device 210 could not prepare the data of the third artificial neural network data operation request (B) in advance, an operation of the memory 270 is treated as a single read access, it is infeasible to physically avoid latency penalty. In other words, if prediction is wrong, the latency penalty occurs once. After the updated data and address order information is stored in the data order memory 230, when the processor 260 performs read accesses in the same pattern, a next data operation that follows the first artificial neural network data operation request A may be accurately predicted as the third artificial neural network data operation request (B), whereby the penalty can be minimized.

If prediction of the next address by the internal controller 220 is incorrect, there may be an actual operation error, but there is a case in which the processor 260 jumps to another node due to a network structure. For example, there may be a case in which the processor 260 deletes/omits a part of layers or a part of nodes of an artificial neural network. If the artificial neural network is adaptively deformed as described above, physical latency penalty cannot be avoided at the first time, but this process is stored as updated data and address order information in the data order memory 230, and thereafter, according to a changed configuration, next data can be prepared in advance without any latency penalty.

In addition, in a state in which the data and address order information is initialized according to write requests of an artificial neural network operation, even when read requests are made in a different order from the write requests, the prediction of the next address of the internal controller 220 may be wrong initially. However, the internal controller 220 may separately generate data and address order information at the time of write requests and data and address order information at the time of read requests, and store them in the data order memory 230, thereby preparing the next data in advance without latency penalty.

If the third address information does not coincide with the address information of the second artificial neural network data operation request (B'), which has been previously generated/predicted as the next address information in the internal controller 220, the internal controller 220 may compare whether channel codes/identification codes of the third artificial neural network data operation request (B) and the first artificial neural network data operation request (A) are identical to channel codes/identification codes associated with the previously stored data and address order information. At this time, if previous channel codes/identification codes based on the second artificial neural network data operation request (B') and the channel codes/identification codes of the current third artificial neural network data operation request (B) and the first artificial neural network data operation request (A) are identical to each other, it can be considered as a case in which there is an error in an operation of the data and address order information itself or the processor 260 dynamically changes the artificial neural network, so that the existing data and address order information is updated. If the previous channel codes/identification codes based on the second artificial neural network data operation request (B') and the channel codes/identification codes of the current third artificial neural network data operation request (B) and the first artificial neural network data operation request (A) are not identical to each other, it can be interpreted as a case in which the data and address order information is applied differently according to types of artificial neural network operations, so new data and address order information may be generated, and the channel codes/identification codes of the current third artificial neural network data operation request (B) and the first artificial neural network data operation request (A) may be stored in the data order memory 230 as information associated with new data and address order information.

For example, in case of write requests, data is written in a first type order, but in case of read requests, data may be read in a second type order. In a training process, the order of write requests and the order of read requests may be identical to each other, but in an inference process, the order of write requests and the order of read requests may be different from each other, or vice versa (the order of write requests and the order of read requests are identical to each other in the inference process, and the order of write requests and the order of read requests are different from each other in the training process). Also, depending on a data domain, input data has the same order in case of write requests and in case of read requests, but weight data or activation parameters may have different orders of accessing data according to a situation, so the data and address order information may be generated in association with a channel code/identification code, and may be stored in the data order memory 230. The data and address order information that is adaptively adjusted based on environment/state information including the channel code/identification code will be expressed as adaptive order information, for convenience.

When the internal controller 220 uses the data and address order information stored in the data order memory 230, which is an internal memory, it may determine adaptive order information used to generate next address information, based on structure and characteristic information of the artificial neural network associated with artificial neural network operations, whether the first artificial neural network data operation request is a read request or a write request, and first identification information included in the first artificial neural network data operation request.

Based on the adaptive order information, and the data and address order information stored in the data order memory 230, which is an internal memory, the second artificial neural network data operation request may be predicted and next address information may be generated. For example, when the first/second artificial neural network data operation request is associated with an operation where an activation parameter is generated and stored, the next address information may be generated in a raster scan order. Alternatively, when the first/second artificial neural network data operation request is associated with an operation of reading a weight of synapse connected to nodes of the next layer, it may be read according to a shape of weight kernel. In this manner, the next address information may be generated based on the adaptive order information according to a type of the artificial neural network data operation request and the associated artificial neural network operation associated. Alternatively, when activation parameters are generated and stored, they are stored in the raster scan order, and when the activation parameters are read from the next layer, they may be read in an order based on the shape of the weight kernel. In the present disclosure, even when a reading order and a writing order are different, it is possible to predict the reading order by slightly adding a formula for correcting an access address. Therefore, even in this case, it is still possible to maximize a memory bandwidth and minimize or remove latency.

The internal controller 220 may generate, as the first address information, information of a current address in which data of the first artificial neural network data operation request is stored in the at least one memory using the data and address order information stored in the internal memory, based on the first identification information included in the first artificial neural network data operation request and whether the first artificial neural network data operation request is a read request or a write request, even when the first artificial neural network data operation request does not include an address. In case of data operations having the same channel code/identification code, previously stored data and address order information may be applied as it is. In a training process of the artificial neural network, after data is initially stored in the memory 270, a weight value may be overwritten in the same address during successive operations in the training process. In this case, even though the processor 260 does not designate an address value of the memory 270 when overwriting is made, the data management device 210 recognizes the address value, so that data operations can be conducted. Likewise, the feature map/activation parameter may be overwritten in the same address during successive operations in the training/inference process after data is stored in the memory 270 in the training process or the inference process. Thus, when the data management device 210 according to the present disclosure is used, the processor 260 may transmit the data operations to the data management device 210 without designating addresses to the data operations in the same kind of data operations. At this time, in order to clearly notify an end of successive data operations of the same type, information indicating an end of the last data operation in the same kind of data operations may be included in a data operation request by the processor 260. For the same kind of data operations, if a data operation is transmitted with address information after data operations are transmitted without address information, this data operation may be used as a role of notifying that such a data operation is the last data operation request or the last data operation request is closely upcoming. Alternatively, information on a structure of the artificial neural network may be shared with the data management device 210 in such a manner that the data management device 210 can determine the end of the same kind of data operations, itself.

Submodules (access data type detect, next read/write address generator, check legitimate access) included in the internal controller 220 of FIG. 2 are illustrated by way of example, and the spirit of the present disclosure is limited to this embodiment. The submodules (Access data type detect, Next read/write address generator, check legitimate access)

included in the internal controller 220 of FIG. 2 are shown for the purpose of illustrating main functions, and may be implemented within the internal controller 220 with hardware or may be implemented so that the internal controller 220 may perform a corresponding function by software.

Figure 3:
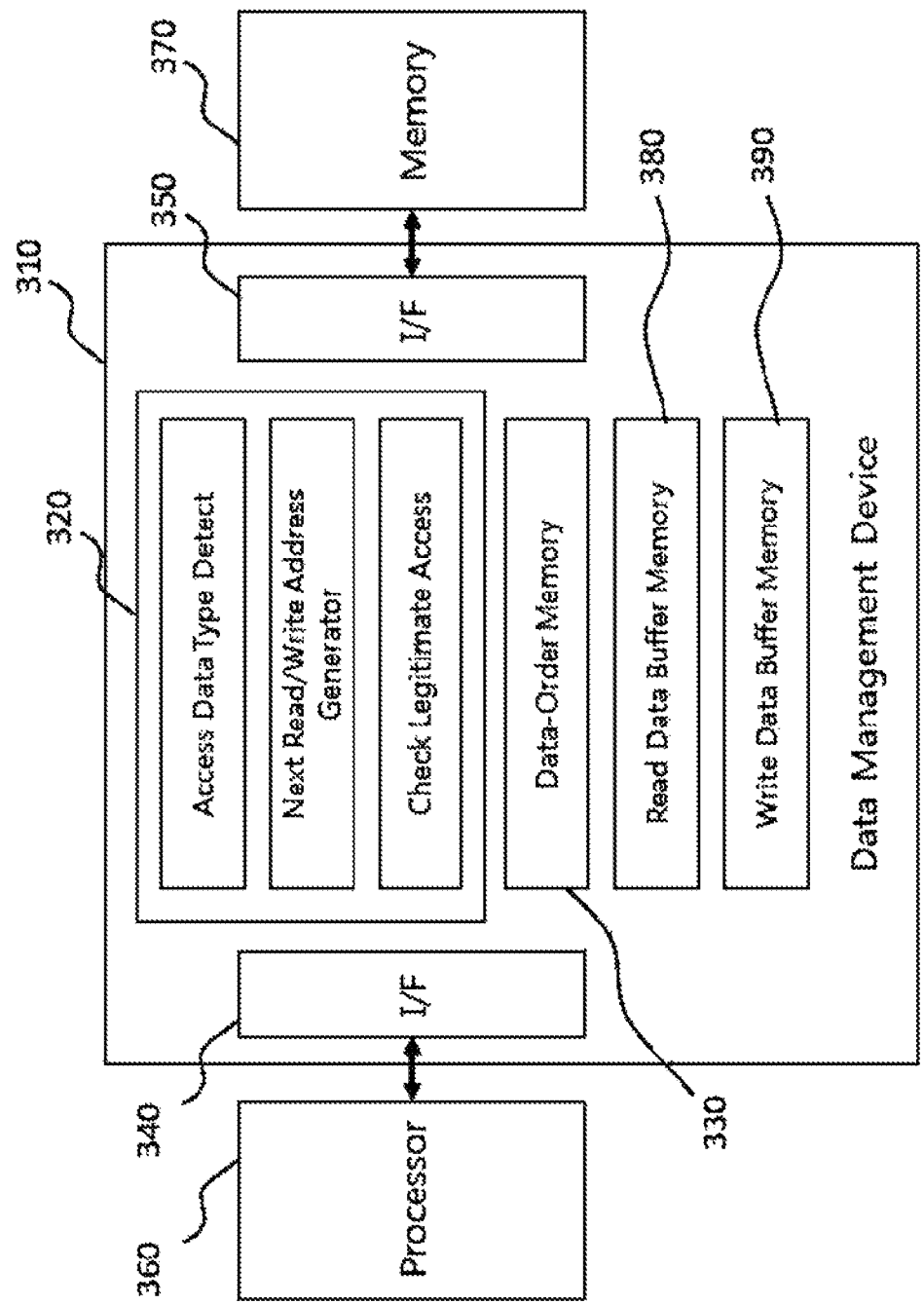
FIG. 3 is a diagram illustrating a data management device for supporting a high speed artificial neural network operation according to another embodiment of the present disclosure.

FIG. 3 is a diagram illustrating a data management device 310 for supporting a high speed artificial neural network operation according to another embodiment of the present disclosure.

Referring to FIG. 3, matters that at least one processor 360 transmits a data operation request to the data management device 310 via a processor-side interface circuit 340, and the data management device 310 transmits a memory data operation to at least one memory 370 via a memory-side interface circuit 350 are identical to those of FIG. 2, and a matter that the data management device 310 includes an internal controller 320 and a data order memory 330 is identical to that of FIG. 2. Thus, redundant descriptions are omitted.

The data management device 310 of the present disclosure may further include a read data buffer memory that when the first artificial neural network data operation request is a read request, performs a readahead operation on data which is predicted as the second artificial neural network data operation request from the at least one memory 370 based on the next address information, and then, stores readahead data, which is a result of the readahead operation.

At least one of the internal controller 320 or the memory-side interface circuit 340 may transmit the second memory data operation request to the at least one memory 370, may control the at least one memory 370 so that the at least one memory 370 performs a memory operation corresponding to the second memory data operation request, and may receive data corresponding to the second memory data operation request from the at least one memory 370 when the second memory data operation request is a read operation.

When a next artificial neural network data operation request is not received or is delayed after the first artificial neural network data operation request (A), the internal controller 320 may predict a second artificial neural network data operation request (B') based on a first artificial neural network data operation request (A), and the data management device 310 may transmit the second artificial neural network data operation request (B') to the memory 370 and receive read data of the second artificial neural network data operation request (B') from the memory 370. The read data of the second artificial neural network data operation request (B') received from the memory 370 is stored in the read data buffer memory 380, and thereafter, a third artificial neural network data operation request (B) that is an actual next data operation request is received from the processor 360. When the third artificial neural network data operation request (B) and the second artificial neural network data operation request (B') are identical to each other, read data of the second artificial neural network data operation request (B'), which is stored in the data buffer memory 380 by the readahead operation, may be provided to the processor 360 in response to the third artificial neural network data operation request (B).

At least one of the internal controller 320 or the memory-side interface circuit 340 may transmit the second memory data operation request to the at least one memory 370 and control the at least one memory 370 so that the at least one memory 370 maintains a ready state for performing a memory operation corresponding to the second memory data operation request. For example, it is assumed that in a first successive write operation, an area in the memory 370 is distributively allocated so that successive pieces of write data are distributed and stored in multiple areas in the memory 370, and the same kind of overwrite requests for distributively stored data are successively received. In this case, since write data must be stored by distributing a space of the memory 370 during a successive write operation, a time difference between write requests of the processor 360 and an actual storage operation of the memory 370 may occur. In this case, the data management device 310 may further include a write data buffer memory 390. The write data buffer memory 390 may store successive write requests and write data transmitted from the processor 360, and transmit the write data to the memory 370 to thereby minimize or reduce latency penalty recognized by the processor 360 to zero. In addition, the second artificial neural network data operation request (B') to be followed next based on the first artificial neural network data operation request (A) that has been currently received may be predicted, and the second artificial neural network data operation request (B') may be transmitted to the memory 370 so that the memory 370 may be controlled in such a manner that the memory 370 is ready to process the second artificial neural network data operation request B'. At this time, in a state in which the memory 370 is not yet ready to process the second artificial neural network data operation request (B'), when the third artificial neural network data operation request (B) that is identical to the second artificial neural network data operation request (B') is received from the processor 360, the write data buffer memory 390 may temporarily store the third artificial neural network data operation request (B), while when preparation of the memory 370 to process the third artificial neural network data operation request (B) has completed, the write data buffer memory 390 may transmit the third artificial neural network data operation request (B) to the memory 370.

When the write data that has stored in the write data buffer memory 390 is stored in the memory 370, the internal controller 320 may erase the write data from the write data buffer memory 390. The internal controller 320 may store next write operations and write data that are received from the processor 360 as much as an empty space occurs in the write data buffer memory 390, in the write data buffer memory 390, and may directly transmit the next write operations and write data received from the processor 360 without passing through the write data buffer memory 390.

The internal controller 320 may monitor a proportion of the empty space in the write data buffer memory 390. When the proportion of the empty space is equal to or greater than a threshold, the internal controller 320 may notify the processor 360 that the proportion of the empty space in the write data buffer memory 390 is equal to or greater than the threshold through an interrupt, or may perform adjustment so that the processor 360 can check the proportion of the empty space in the write data buffer memory 390.

Figure 4:
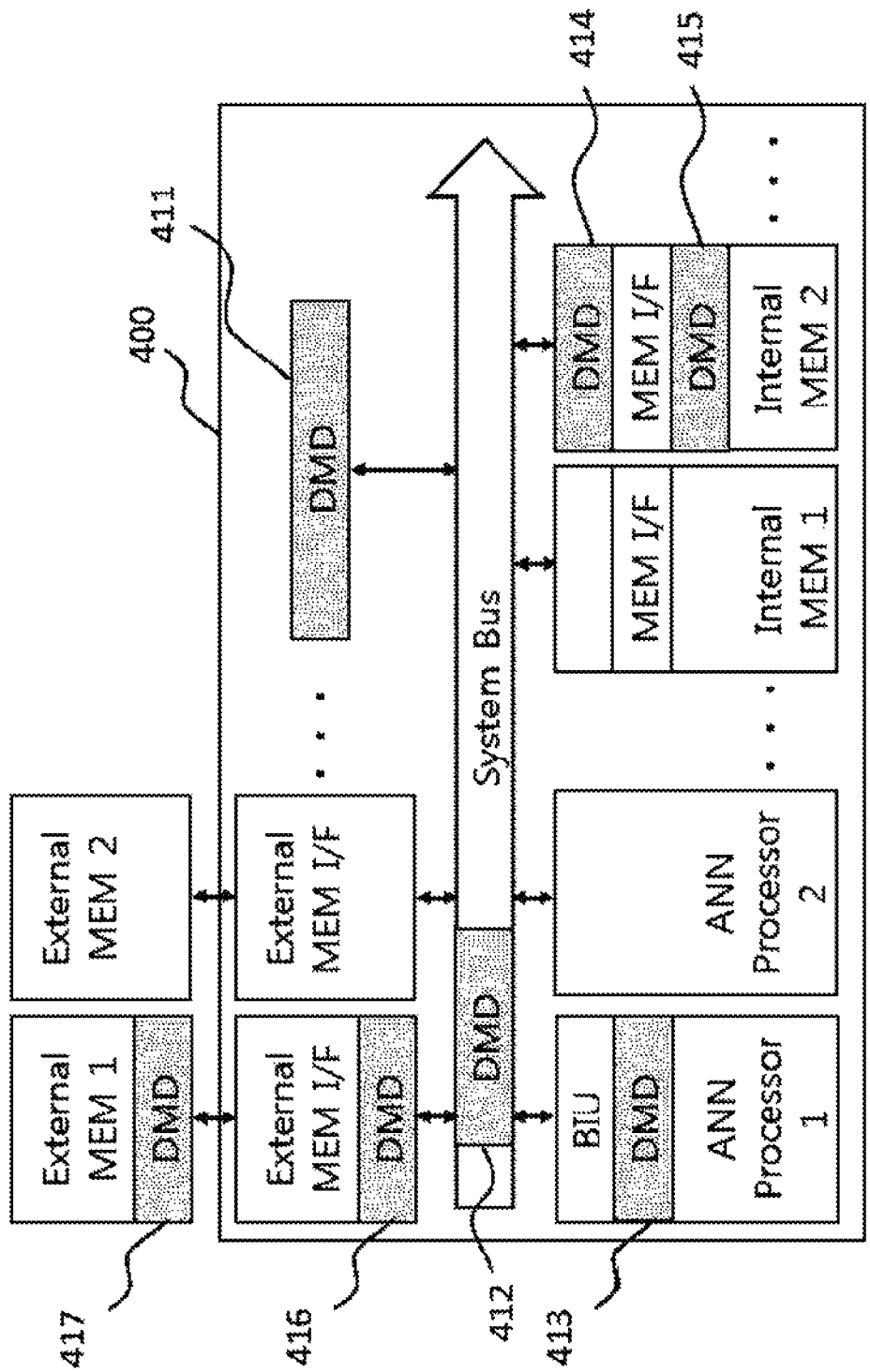
FIG. 4 is a diagram illustrating a case in which a data management method for supporting an artificial neural network operation is performed in a computing system according to still another embodiment of the present disclosure.

FIG. 4 is a diagram illustrating a case in which a data management method for supporting an artificial neural network operation is performed in a computing system 400 according to still another embodiment of the present disclosure.

The computing system 400 for supporting an artificial neural network operation according to an embodiment of the present disclosure shown in FIG. 4 is a computing system having at least one processor and at least one memory and supporting an artificial neural network operation executed by the at least one processor. The computing system 400 includes a processor-side interface for receiving an artificial neural network data operation request associated with the artificial neural network operation executed by the at least one processor; a memory-side interface for transmitting a memory data operation request based on the artificial neural network data operation request to the at least one memory, and receiving memory data in response to the memory data operation request from the at least one memory; and a data order memory for storing data and address order information.

The processor shown in FIG. 4 is a processor capable of executing an artificial neural network operation alone or in cooperation. Also, although not shown in FIG. 4, a processor external to the computing system 400 may be used to perform an artificial neural network operation.

The memory illustrated in FIG. 4 may include at least one of an internal memory and an external memory of the computing system 400. The internal memory or the external memory may include various conventional memory devices. For example, a SRAM, a DRAM, an E2PROM, a flash Memory, or an NVRAM (nonvolatile RAM) may be included as an internal memory or an external memory of the computing system 400.

The computing system 400 of FIG. 4 may include an external memory interface connected to an external memory. The external memory interface may transmit the memory data operation request to at least one external memory outside of the computing system 400 and receive memory data in response to the memory data operation request from the at least one external memory.

Configurations and functions shown in the data management device 210 or 310 of FIG. 2 or 3 may be implemented in a form of an independent data management device 411 within the computing system 400, or may be distributed and disposed in various elements inside the computing system 400. The configurations and functions shown in the data management device 210 or 310 of FIG. 2 or 3 may be distributed and disposed anywhere in a movement path of data existing between cells of a memory and an artificial neural network processor within the computing system 400.

In an embodiment of present disclosure, the computing system 400 of FIG. 4 may include an independent data management device 411 which is connected to a system bus. In this case, the independent data management device 411 may perform the same functions as the data management device 210 or 310 of FIG. 2 or 3. In a modified embodiment of the present disclosure, the independent data management device 411 includes some of the configurations and functions shown in the data management device 210 or 310 of FIG. 2 or 3, and remaining configurations and functions of the data management device 210 or 310 of FIG. 2 or 3 may be dispersedly included in a data management device 412 which is embedded in a system bus architecture, a data management device 413 which is configured as an artificial neural network processor-side interface, a data management device 414 which is embedded in a wrapper block between a memory interface of an internal memory and a system bus, a data management device (not shown) which is embedded in the memory interface of the internal memory, a data management device 415 which is embedded in the internal memory, a data management device (not shown) which is embedded in a memory interface corresponding to an external memory, a data management device 416 which is embedded in a wrapper block between a memory interface of an external memory and a system bus, and/or a data management device 417 which is embedded in the external memory.

In another embodiment of the present disclosure, the computing system 400 of FIG. 4 may implement configurations and functions shown in the data management device 210 or 310 of FIG. 2 or 3 by the data management devices 413, 414, 415, 416, and 417 disposed at remaining locations except for the independent data management device 411. The configurations and functions shown in the data management device 210 or 310 of FIG. 2 or 3 may be dispersedly included in the data management device 412 which is embedded in a system bus architecture, the data management device 413 which is configured as an artificial neural network processor-side interface, the data management device 414 which is embedded in a wrapper block between a memory interface of an internal memory and a system bus, a data management device (not shown) which is embedded in the memory interface of the internal memory, the data management device 415 which is embedded in the internal memory, a data management device (not shown) which is embedded in a memory interface corresponding to an external memory, the data management device 416 which is embedded in a wrapper block between a memory interface of an external memory and a system bus, and/or the data management device 417 which is embedded in the external memory.

The computing system 400 of FIG. 4 may perform the same functions as those of the data management device 210 or 310 of FIG. 2 or 3 by components that are dispersedly included in the independent data management device 411, the data management device 412 which is embedded in a system bus architecture, the data management device 413 which is configured as an artificial neural network processor-side interface, the data management device 414 which is embedded in a wrapper block between a memory interface of an internal memory and a system bus, a data management device (not shown) which is embedded in the memory interface of the internal memory, the data management device 415 which is embedded in the internal memory, a data management device (not shown) which is embedded in a memory interface corresponding to an external memory, the data management device 416 which is embedded in a wrapper block between a memory interface of an external memory and a system bus, and/or the data management device 417 which is embedded in the external memory. However, since the computing system 400 includes a memory and a processor therein, it is different from the data management device 210 or 310 of FIG. 2 or 3 in that data operations between the processor, the data management devices 411 to 417, and the memory can be performed via a system bus in the computing system 400.

The computing system 400 may generate the memory data operation request based on the artificial neural network data operation request, may identify a domain and a type of the artificial neural network data operation request based on identification information included in the artificial neural network data operation request, may generate an order of data of the artificial neural network data operation request associated with the identification information, and information of an address in which the data of the artificial neural network data operation request is stored in the order in the at least one memory, as the data and address order information, and when the processor-side interface receives a first artificial neural network data operation request, may generate, as next address information, information of a second address in which data of a second artificial neural network data operation request that will follow the first artificial neural network data operation request is stored in the at least one memory based on information of a first address in which data of the first artificial neural network data operation request is stored in the at least one memory, and the data and address order information stored in the data order memory.

At least one of the data management devices 411 to 417 dispersedly disposed in the computing system 400 may transmit the second memory data operation request to the at least one memory, may control the at least one memory so that the at least one memory performs a memory operation corresponding to the second memory data operation request, and when the second memory data operation request is a read operation, may receive data corresponding to the second memory data operation request from the at least one memory. In addition, a data management device (not shown) according to another embodiment of the present disclosure may be dispersedly disposed in an interface, a memory, a bus architecture, and a buffer or cache memory block in an artificial neural network processor.

At least one of the data management devices 411 to 417 dispersedly disposed in the computing system 400 may transmit the second memory data operation request to the at least one memory and may control the at least one memory so that the at least one memory maintains a ready state capable of performing a memory operation corresponding to the second memory data operation request.

At least one of the data management devices 411 to 417 dispersedly disposed in the computing system 400 may include a module that receives the first artificial neural network data operation request and then, predicts a second artificial neural network data operation request which is expected to follow the first artificial neural network data operation request based on the first identification information included in the first artificial neural network data operation request.

At least one of the data management devices 411 to 417 dispersedly disposed in the computing system 400 may include a module that generates a second memory data operation request including the next address information based on the first artificial neural network data operation after receiving the first artificial neural network data operation request, and transmits the second memory data operation request to the at least one memory via the memory-side interface.

At least one of the data management devices 411 to 417 dispersedly disposed in the computing system 400 may further include a read data buffer memory (not shown) that when the first artificial neural network data operation request is a read request, performs a readahead operation on data which is predicted as the second artificial neural network data operation request from the at least one memory based on the next address information, and then, stores readahead data which is a result of the readahead operation.

As described above, address information may be omitted in a data operation request transmitted from a processor inside or outside the computing system 400 in the same kind of successive data operation requests (for example, when data of the same domain is overwritten). In this case, at least one of the data management devices 411 to 417 dispersedly disposed in the computing system 400 may generate address information on the same kind of successive data operation requests and transmit it to the memory. In addition, at least one of a buffer memory-related block inside a processor, a system bus, a memory interface and an inner part of a memory may generate address information on the same kind of successive data operation requests. A submodule that generates address information may be implemented in the form of a hardware block or a block in which software is embedded.

Figure 5:
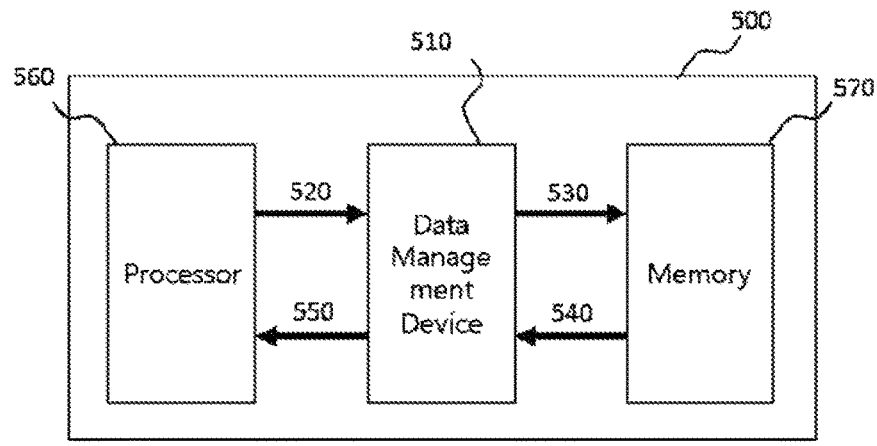
FIG. 5 is a diagram illustrating an example of a data operation between a processor and a memory, which is performed via a data management device according to an embodiment of the present disclosure.

FIG. 5 is a diagram illustrating an example of a data operation between a processor and a memory, which is executed via a data management device 510 in a computing system 500 according to an embodiment of the present disclosure.

The data management device 510 is illustrated as a single independent device for convenience of description, but as described in FIG. 4, may be dispersedly disposed at various locations in a path through which data is transmitted and received between a processor 560 and a memory 570, such as the processor 560, the memory 570, and a system bus architecture (not shown) in the computing system 500.

After receiving a first artificial neural network data operation request 520, the data management device 510 may generate a first memory data operation request 530 including first address information and transmit it to the memory 570. In response to the first memory data operation request 530, the memory 570 may transmit first memory data 540 to the data management device 510, and the data management device 510 may provide the first artificial neural network data 550 based on the first memory data 540 to the processor 560, in response to the first artificial neural network data operation request 520.

Figure 6:
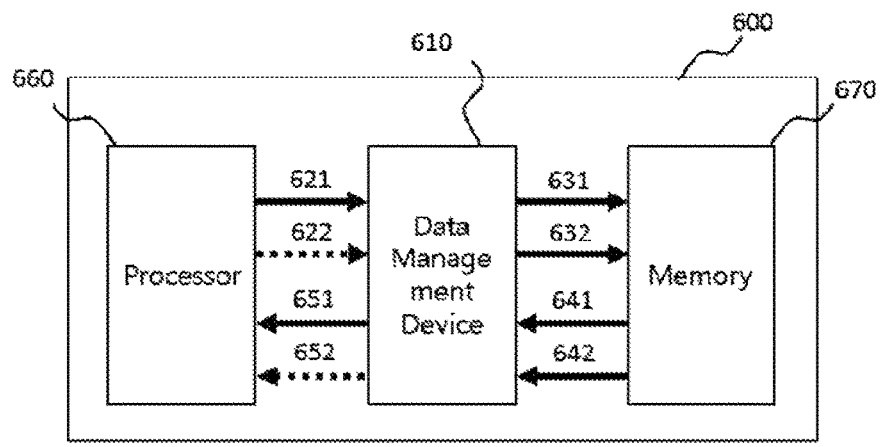
FIG. 6 is a diagram illustrating another example of a data operation between a processor and a memory, which is performed via a data management device according to an embodiment of the present disclosure.

FIG. 6 is a diagram illustrating an example of a data operation between a processor and a memory, which is executed via a data management device 610 in a computing system 600 according to an embodiment of the present disclosure.

The data management device 610 is illustrated as a single independent device for convenience of description, but as described in FIGS. 4 and 5, may be dispersedly disposed at various locations in a path through which data is transmitted and received between a processor 660 and a memory 670, such as the processor 660, the memory 670, and a system bus architecture (not shown) in the computing system 600.

In general, in a conventional CPU configuration, prefetching or caching is performed based on temporal locality or spatial locality. Such conventional catching may be catching a data block containing data when the data is requested (spatial locality) or evicting data that a long period of time has elapsed after an access thereof was made from a cache (temporal locality).

The present disclosure illustrates the data management device 610 and the computing system 600 that predict a next data request based on a data request currently received from the processor 660, based on artificial neural network (ANN) data locality existing in an artificial neural network (ANN).

In a computation of an artificial neural network, data locality exists as in a conventional CPU, and its characteristics are different from the data locality of the CPU. For a specific example, in the case of training, the artificial neural network reads input data used for training in order from a memory and computes it to change internal weight values. Once training is completed using all learning data, it is said that 1 epoch training has been completed, and normal artificial neural network training is repeated over several to hundreds of epochs. Therefore, there is data locality in that input data is repeatedly read from a memory in the same order several to several hundred times during training.

In the case of weights, after performing a computation of an inference process by reading weights stored in a memory in order during training, weight values are updated through post-processing and written to the memory in order. While training is repeated, weight data is read back from the memory in the same order, and there is also data locality in which weight values changed after post-processing are written to the memory in the same order. On the other hand, in the case of inference, computation of given artificial neural network algorithm is executed by reading weight values from the memory in the same order at each inference. In other words, even in inference, data locality exists in that weight values are read from the memory in the same order for each inference operation.

A feature map (feature map) or an activation map (activation parameter map) is output data from one layer in a multilayered artificial neural network, which is temporarily stored in a memory and used as an input feature map in an operation of a next layer. An order in which the input feature map is read from the memory during an operation of the next layer is an order in which feature map or activation map data output from a previous layer is first stored in the memory.

An order of accessing data may be different from the above-described order according to a structure of a specific artificial neural network, an operation method of a processor that processes the artificial neural network, and the like. However, it can be inferred schematically based on the above-described data order information, and a changed access pattern is constant under the corresponding artificial neural network structure and processor operation method. Therefore, even in this case, clear data locality exists.

The present disclosure suggests that clear data locality exists in the artificial neural network operation, and by using this, suggests a data management device capable of minimizing or removing a delay time caused by memory access when a processor with superior performance compared to a memory asks the memory for data necessary for the operation of the artificial neural network. In the suggested data management device, the processor predicts data required for future operation and prefetches it to a storage device (e.g., a cache) adjacent to the processor based on the artificial neural network data locality as described above, so that data is supplied with a minimal delay time when the processor requests the corresponding data. In addition, in the case of overwriting updated weight values in the memory during training and performing a write operation of feature map data calculated and output from one layer on the memory during inference, the suggested memory management device may automatically generate a write address based on the artificial neural network data locality described above, thereby simplifying and shortening actions of the processor.

After receiving a first artificial neural network data operation request 621, the data management device 610 may generate a first memory data operation request 631 including first address information and transmit the first memory data operation request 631 to the memory 670. In response to the first memory data operation request 631, the memory 670 may transmit first memory data 641 to the data management device 610, and in response to the first artificial neural network data operation request 621, the data management device 610 may provide first artificial neural network data 651 based on the first memory data 641 to the processor 660.

After receiving the first artificial neural network data operation request 621, the data management device 610 may generate a second memory data operation request 632 including next address information based on the first artificial neural network data operation 621 and transmit the second memory data operation request 632 to the memory 670.

When a second artificial neural network data operation request 622 that follows the first artificial neural network data operation request 621 is not transmitted from the processor 660 or is delayed, the data management device 610 may predict the second memory data operation request 632 including the next address information in consideration of characteristics of an artificial neural network, characteristics of an artificial neural network operation, and characteristics of an artificial neural network data operation.

The predicted second memory data operation request 632 is transmitted along with the predicted next address information to the memory 670, and in response to the predicted second memory data operation request 632, the memory 670 may transmit second memory data 642 to the data management device 610, and the data management device 610 may temporarily store the second memory data 642 in a read data buffer memory therein.

Thereafter, when a third artificial neural network data operation request 622 that actually follows the first artificial neural network data operation request 621 is transmitted as a predetermined time has elapsed from the processor 660 or obstacles have resolved, the data management device 610 verifies whether the third artificial neural network data operation request 622 that has been actually received and the predicted second memory data operation request 632 correspond to each other. When it is confirmed that the actually received third artificial neural network data operation request 622 and the predicted second memory data operation request 632 correspond to each other without an error, the data management device 610 may provide the second memory data 642 as third artificial neural network data 652 to the processor 660 in response to the third artificial neural network data operation 622.

A general memory has a latency of more than several clock cycles in any single memory read. This causes a processor to enter an IDLE state until necessary data is provided, so that the processor cannot perform actual operations. This is a limitation that applies equally to the memory 660 and the processor 670 of the present disclosure.

After each data group used in the artificial neural network is written in the memory 670, an order in which the processor 660 reads data of the corresponding data group for training and inference generally complies with an order in which pieces of data of the corresponding data group are first written in the memory 670, is determined based on the order in which they are first written in the memory 670, or is determined based on an order in which they are previously written in the memory 670.

When the system 600 or the processor 660 accesses any data included in a specific data group for an artificial neural network (e.g., input data for training, weights, and activation parameters), the data management device 610 may predict which data of the data group the processor 660 or system 600 will request to access.

When the processor 660 resumes an artificial neural network data operation after a certain period of time has elapsed at a time at which a continuous artificial neural network data operation is stopped, first data of the resumed data operation request is processed as an arbitrary single memory read operation according to the prior art, so physical latency cannot be avoided. At this time, if the read data buffer memory (a high speed storage device that can directly provide data without latency) included in the data management device 610 of the present disclosure has previously stored the amount of data capable of being continuously provided for a period of time equal to a latency period caused by the arbitrary single memory read operation, by a readahead operation, the processor 660 may immediately perform an operation without delay by providing data to the processor 660 without latency for an arbitrary memory read operation, so that overall operation performance may increase.

A process in which the data management device 610 predicts the second memory data operation request 632 that will occur next to the first artificial neural network data operation request 621 that has already been received may be determined in consideration of information on the artificial neural network operation (the channel code/identification code) included in the first artificial neural network data operation request 621, and a sequential address mapping process on the memory 670 that has been previously performed during successive write operations, and may be performed using information on a memory data access pattern of the artificial neural network operation.

When the processor 660 starts training or inference operation of the artificial neural network, it starts reading data of each data group and may frequently repeat interruption/resume of the data reading in an entire operation process in which node values of each layer of the artificial neural network are output and operations are completed. As mentioned above, when reading is resumed after interruption of reading, as a first access being resumed becomes an arbitrary single access, a great latency is inevitable in the prior art.

When a read operation of next necessary data is temporarily stopped for any reason while the processor 660 continues reading data, the data management device 610 and the computing system 600 of the present disclosure read data which is predicted as the next necessary data from the memory 670 in advance and store the date in a read data buffer memory (not shown) therein. At this time, the data previously stored in the read data buffer memory may supply data to the processor 660 in place of the memory 670 during a latency period caused when a read operation of the processor 660 is resumed after being stopped. At the same time, the computing system 600 or the data management device 610 accesses the memory 670 and reads data which is predicted to follow the data in the read data buffer memory in advance, thereby filling a space from which the data supplied to the processor 660 is eliminated. In view of the processor 660, it is recognized that the memory 670 operates with a latency of 0 during a read operation, except for a physical delay time of data (propagation delay).

A depth of the read data buffer may be the number of clock cycles required for actual data to be output from the memory 670 from a time at which an address is given to the memory 670. According to an embodiment, an optimal depth may vary depending on an artificial neural network model, types of operational processor 660 and memory 670, and the like. If a buffer depth is significant, it is beneficial to increase operation performance, but a buffer memory with a latency of 0 or a high speed operation requires more hardware costs and higher power consumption as compared to a large capacity DDR/SRAM/FLASH memory based on a single memory cell. Therefore, there may be a trade-off that increases the depth of a prefetch buffer. The depth of the read data buffer memory capable of achieving maximum performance may vary depending on the operation performance of the processor 660, data timing, a latency of the memory 670, performance characteristics, and characteristics of an artificial neural network model which is an operation target.

When the computing system 600 or the processor 660 resumes reading the next data of previously read data after the interruption of reading successive data, the data management device 610 or the computing system 600 provides data stored in the buffer, leading to an effect in which the computing system 600 or the processor 660 recognizes the memory 670 as operating with a latency of 0. Meanwhile, the data management device 610 or the computing system 600 may access the memory 670 to read the next data of the last data stored in the buffer, receive the data after an inherent latency of the memory 670, and store it in the buffer or transfer it to the processor 660.

Meanwhile, reasons for an action of stopping the artificial neural network data operation between the processor 660 and the memory 670 may include the following cases:

1) a case in which any operation is not performed between the processor 660 and the memory 670,
2) a case in which an operation is performed on data other than data associated with the artificial neural network between the processor 660 and the memory 670,
3) a case in which the processor 660 performs a data operation with another memory although any operation is not performed between the processor 660 and the memory 670 (for example, when weight data is stored in the corresponding memory 660 while activation parameter or feature map data is stored in another memory, the processor 660 may alternately perform data access between the corresponding memory 670 and another memory. As another example, the processor 660 may not access the memory 670 when performing an operation on data other than data associated with another memory and artificial neural network),
4) a case in which the processor 660 has all data necessary to perform an artificial neural network processing operation and does not need data for a while to perform a necessary operation (such a case may be considered as a cause that may stop successive memory accesses).

Meanwhile, the computing system 600 or the data management device 610 of the present disclosure may determine whether the first artificial neural network operation associated with the first artificial neural network data operation request 621 has been completed based on an order in which data is stored in a data order memory (not shown) included therein, and information of an address in which data is stored in the order in the at least one memory, and may perform operations of the present disclosure if the first artificial neural network operation has not been completed, and omit the operations of the present disclosure if the first artificial neural network operation has been completed.

A data management method for supporting an artificial neural network operation according to an embodiment of the present disclosure is a method which is executed in a computing system 600 having at least one processor 660 and at least one memory 670 and supporting an artificial neural network operation executed by the at least one processor. The data management method may include receiving an artificial neural network data operation request associated with the artificial neural network operation executed by the at least one processor 660; transmitting a memory data operation request based on the artificial neural network data operation request to the at least one memory 670 and receiving memory data in response to the memory data operation request from the at least one memory 670; and generating the memory data operation request based on the artificial neural network data operation request.

Figure 7:
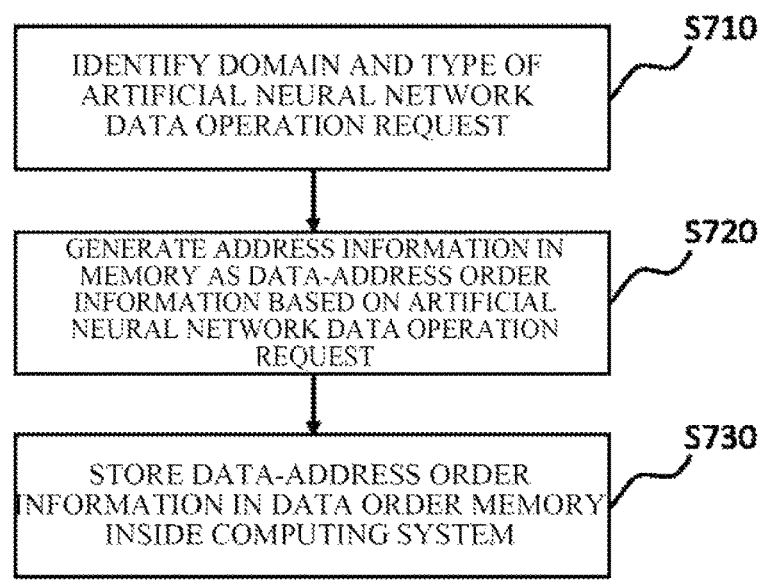
FIG. 7 is an operational flowchart illustrating some processes of a data management method according to an embodiment of the present disclosure.

FIG. 7 is an operational flowchart illustrating some processes of a data management method according to an embodiment of the present disclosure.

Generating the memory data operation request based on the artificial neural network data operation request, which is a part of the data management method of the present disclosure, may include identifying a domain and a type of the artificial neural network data operation request based on identification information included in the artificial neural network data operation request, in step S710; generating an order of data of the artificial neural network data operation request associated with the identification information, and information of an address in which the data of the artificial neural network data operation request is stored in the order in the at least one memory, as the data and address order information, in step S720; and storing the data and address order information in a data order memory inside the computing system, in step S730.

Figure 8:
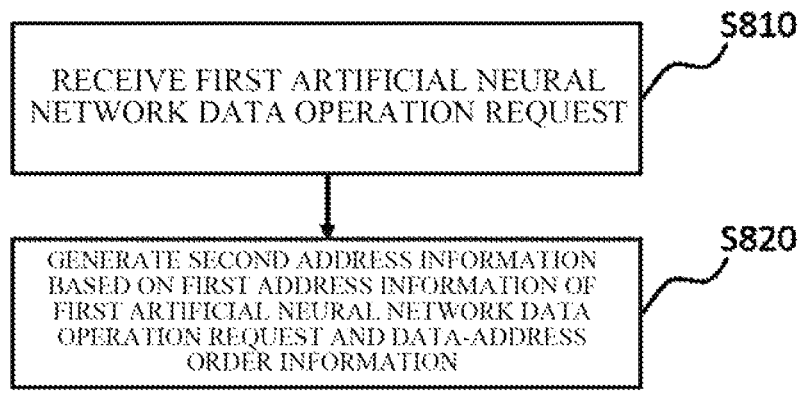
FIG. 8 is an operational flowchart illustrating some processes of a data management method according to an embodiment of the present disclosure.

FIG. 8 is an operational flowchart illustrating some processes of a data management method according to an embodiment of the present disclosure.

Generating the memory data operation request based on the artificial neural network data operation request, which is a part of the data management method of the present disclosure, may include, when the first artificial neural network data operation request is received in step S810, generating information of a second address in which data of the second artificial neural network data operation request following the first artificial neural network data operation request is stored in the at least one memory, as next address information based on information of a first address in which data of the first artificial neural network data operation request is stored in the at least one memory, and the data and address order information stored in the data order memory, in step S820.

Figure 9:
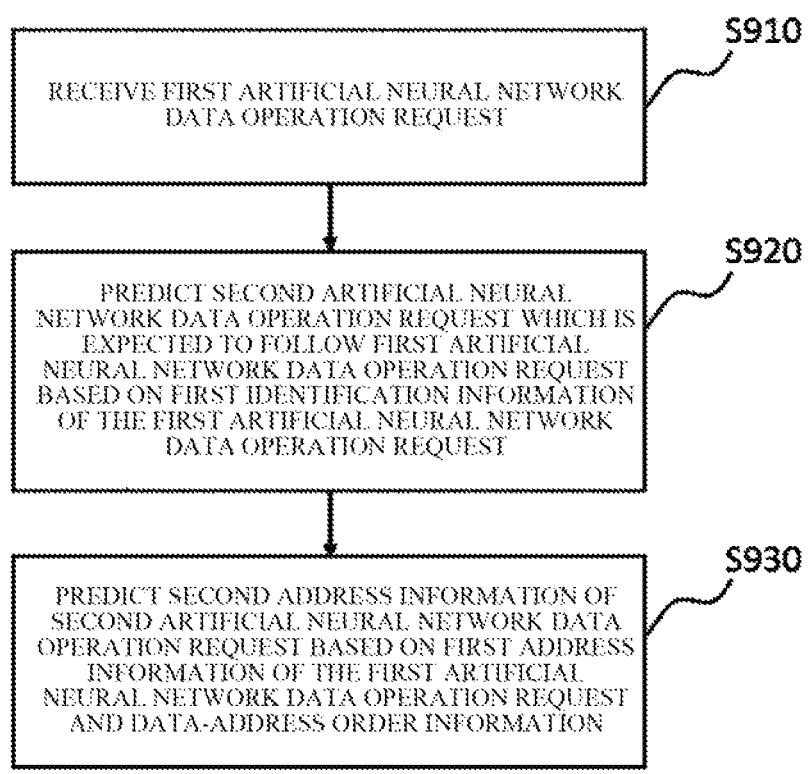
FIG. 9 is an operational flowchart illustrating some processes of a data management method according to an embodiment of the present disclosure.

FIG. 9 is an operation flowchart illustrating some processes of a data management method according to an embodiment of the present disclosure.

Generating the memory data operation request based on the artificial neural network data operation request, which is a part of the data management method of the present disclosure, may include, after receiving the first artificial neural network data operation request in step S910, predicting the second artificial neural network data operation request which is expected to follow the first artificial neural network data operation request based on the first identification information included in the first artificial neural network data operation request, in step S920; and predicting information of a second address in which data of the second artificial neural network data operation request is stored in the at least one memory based on the first address information and the data and address order information, in step S930.

Figure 10:
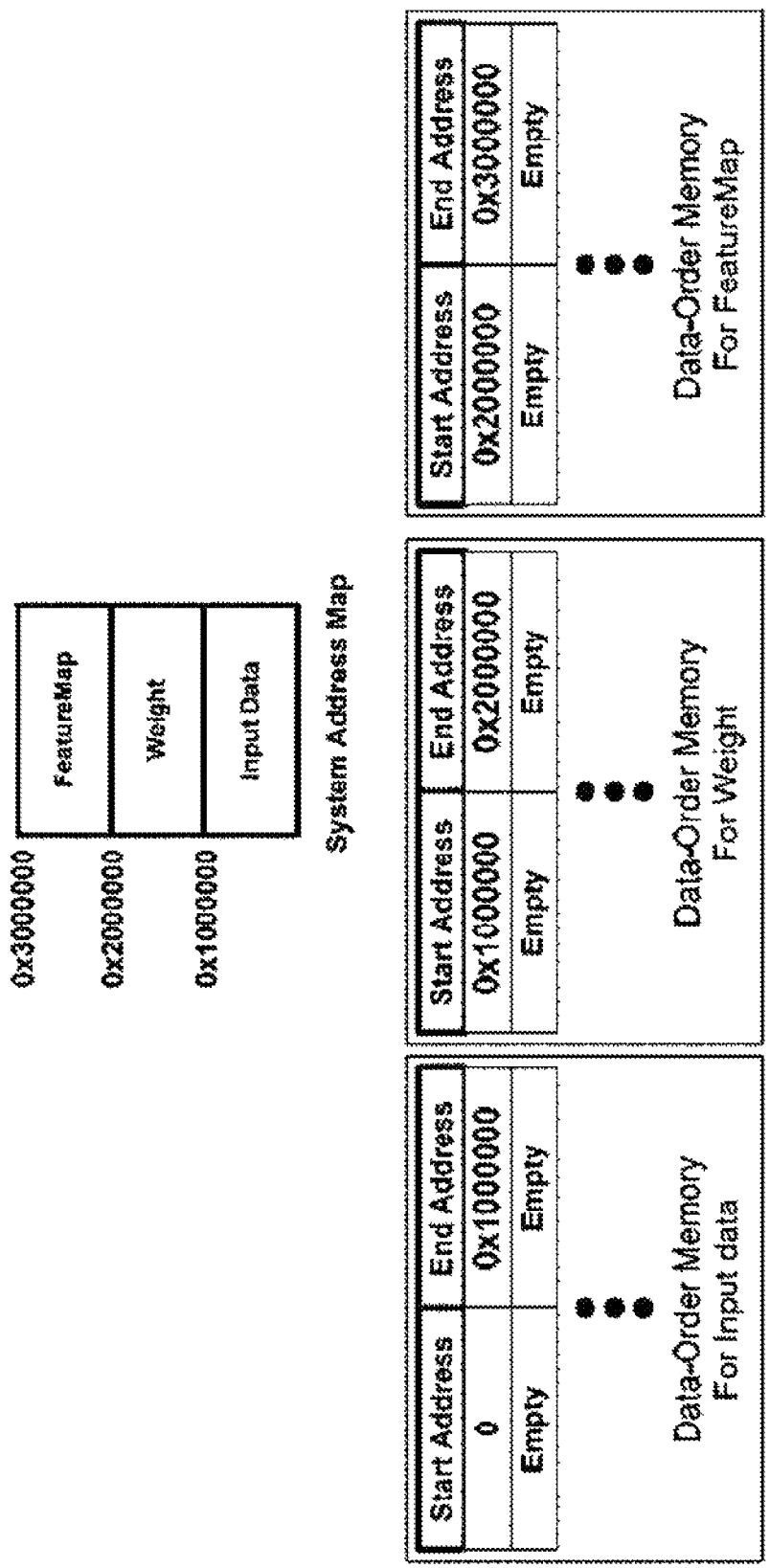
FIG. 10 is a diagram illustrating data and address order information according to an embodiment of the present disclosure.

FIG. 10 is a diagram illustrating data and address order information according to an embodiment of the present disclosure.

FIG. 10 shows an embodiment of data and address order information when a fully dedicated memory is used for an artificial neural network operation.

Referring to FIG. 10, since a given memory is used only for an artificial neural network operation, an address space of the given memory is clearly allocated/divided into memory areas for each of input data, weights, and feature maps. Therefore, the data order memory may store a start address and an end address of the memory area for each data group, and store a memory address for the next read based on addresses of successive reads that have been performed until now, so that it can predict and respond to an operation next to a data operation for an artificial neural network which is required by the system/processor.

A system address map of FIG. 10 conceptually indicates that input data, weights, and feature maps are allocated in divided areas in the memory.

At this time, 0x1000000, which is an end address of input data stored in the data order memory, may be expressed as a value obtained by adding 1 to the last address of actual input data. Similarly, an end address of weight data which is a value obtained by adding 1 to the last address of actual weight data, may also be stored in the data order memory as 0x2000000.

Figure 11:
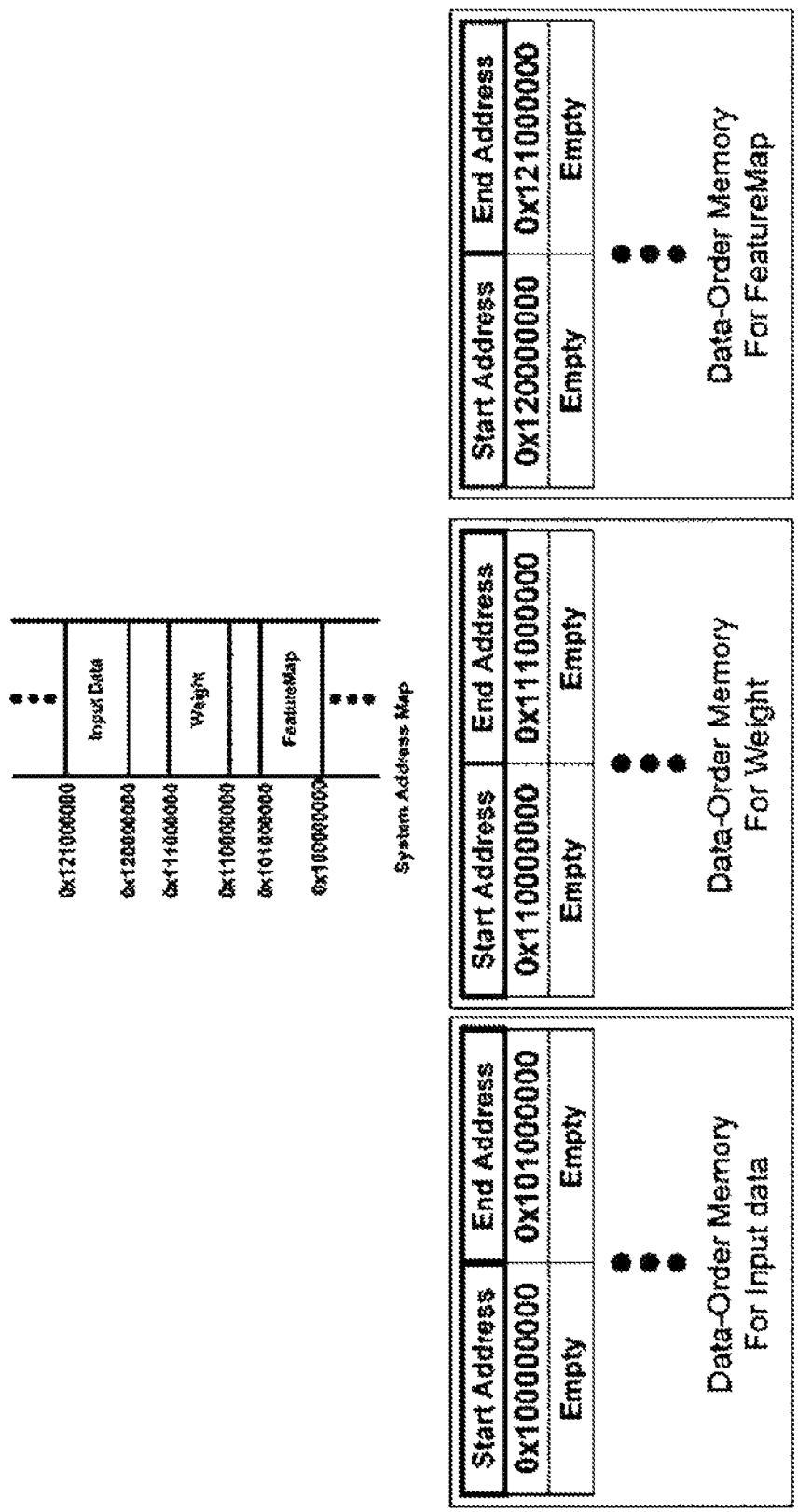
FIG. 11 is a diagram illustrating data and address order information according to an embodiment of the present disclosure.

FIG. 11 is a diagram illustrating data and address order information according to an embodiment of the present disclosure.

FIG. 11 shows an embodiment in which a large, linear memory area for an artificial neural network operation is allocated within an address space of a memory for each use.

The system can use one memory for multiple system tasks in addition to the artificial neural network. In this case, FIG. 11 shows a case where each data domain for an artificial neural network operation is clearly allocated by use.

The system address map shows an input data area, a weight area, and a feature map area that are clearly separated within the entire address space of the memory. Correspondingly, the data order memory may sufficiently play a role by storing a start address and an end address for each data domain, and storing a memory address for the next read based on addresses of successive reads that have been performed up to now.

Figure 12:
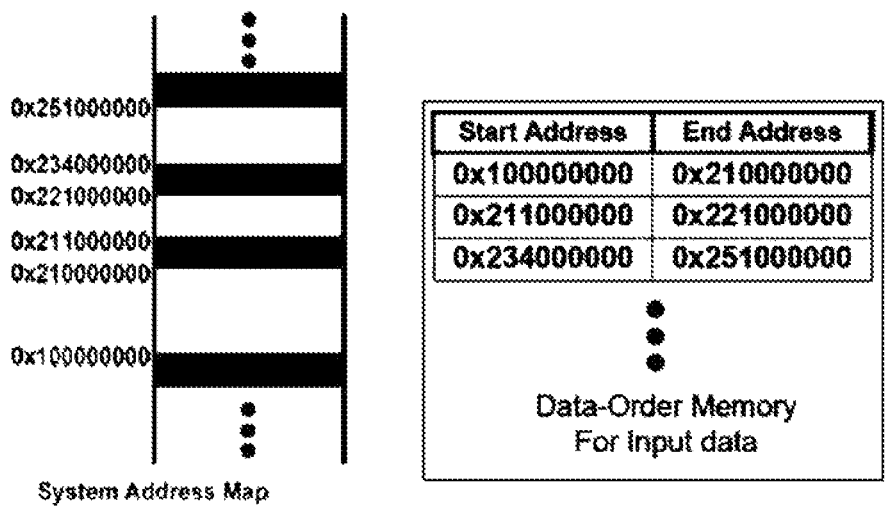
FIG. 12 is a diagram illustrating data and address order information according to an embodiment of the present disclosure.

FIG. 12 is a diagram illustrating data and address order information according to still another embodiment of the present disclosure.

FIG. 12 illustrates an embodiment in which fragmented memory areas are allocated for each data domain.

A system with an operating system (OS) requires a variety of different types of tasks that use memories, and an unallocated memory area is fragmented while each of these tasks uses the memory. Memory areas are allocated dynamically and after the use thereof, memory fragments/fragments are formed in a release process. In this situation, it is very difficult to allocate a single memory area of a large size for an artificial neural network operation. In this case, it is necessary to allocate fragmented memory areas to perform artificial neural network processing. The data order memory stores a connection relationship between these fragmented memory areas. That is, the data and address order information includes information on how fragmented memory areas are connected for one data domain.

The system address map represents a case where fragmented memory areas within one memory address space is used for one data domain. An area represented in white in the system address map is a memory area allocated to the input data. The system address map of FIG. 12 exemplarily describes input data, but the method of implementing the present disclosure is similar in the case of weight data or feature map data.

The data and address order information starts with storing the start and end addresses of each fragmented memory area. At this time, an address of the next read operation may be predicted based on addresses of read operations that have been successively performed until now. When an address of a current read operation reaches the last address of any one of the fragmented memory areas, access to next fragmented memory areas is prepared in advance for the next operation.

A method of storing a start address and an end address in a data order memory according to other embodiments of the present disclosure will be described as follows.

In a first method, when a processor initially figures out artificial neural network information by itself and the processor knows information on allocated memory areas, the processor may access the data order memory like a special function register (SFR) and directly resister the start and end addresses.

In a second method, when the processor first stores data in each channel (a data domain, which means a type of artificial neural network data), the data order memory may record a time at which the processor first stores data of a corresponding data group as a first start address. The processor continuously performs monitoring when storing the data of the data group, and if a write address corresponds to a simple word increase (for example, when the address increases by 4 in a 32-bit system), takes no special action, but if a write address does not correspond to a simple word increase, records an address value of which the simple increase has terminated as an end address of one memory area, and records a jumped address value which is not a simple increase in a start address of the next entry. Afterwards, monitoring whether it corresponds to a simple word increase is continued, and when a write operation of the last data is performed, a corresponding address is written to the end address of the last recorded start address entry, and the data and address order information stored in the data order memory is completed.

Figure 13:
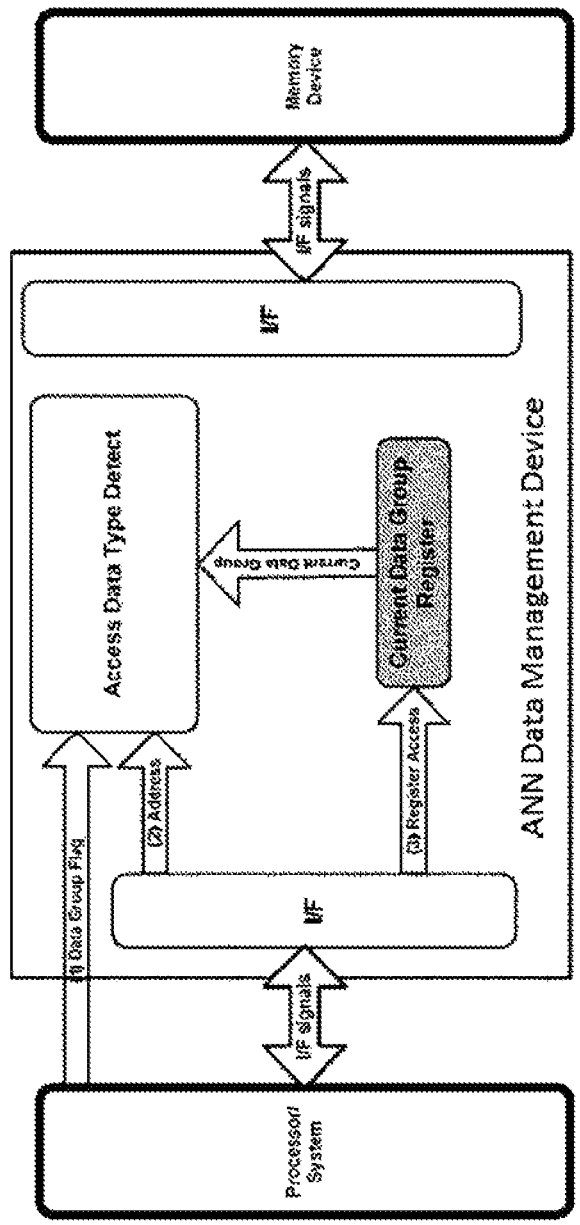
FIG. 13 is a diagram illustrating a method of expressing channel information/identification information according to multiple embodiments of the present disclosure.

FIG. 13 is a diagram illustrating a method of expressing channel information/identification information according to multiple embodiments of the present disclosure In an artificial neural network operation, a data domain/group of data must be accurately expressed for both write access and read access. In FIG. 13, a process in which a processor and a data management device share information on a data group is expressed using the following three embodiments.

(1) Data Group Flag: an access data group can be expressed for each access by using a specific interface I/O signal.

(2) Address: there may be an embodiment of classifying channels in address areas.

(3) Register Access: there may be an embodiment in which a processor records information regarding a channel in a special function register (SFR).

(1) In the embodiment of the Data Group Flag, for example, a 2-bit signal can be added to an I/F with the processor. At this time, if a special signal is 00, it may be a code indicating access to data other than ANN data; if it is 01, it may be a code indicating that the corresponding data group belongs to input data; if it is 10, it may be a code indicating weight data; and if it is 11, it may be a code indicating feature map data.

(2) In the embodiment of the Address, when an address is sent from a processor side, an embodiment in which a memory area to be accessed is differently accessed is possible. This embodiment will be described in detail with reference to FIG. 14.

Figure 14:
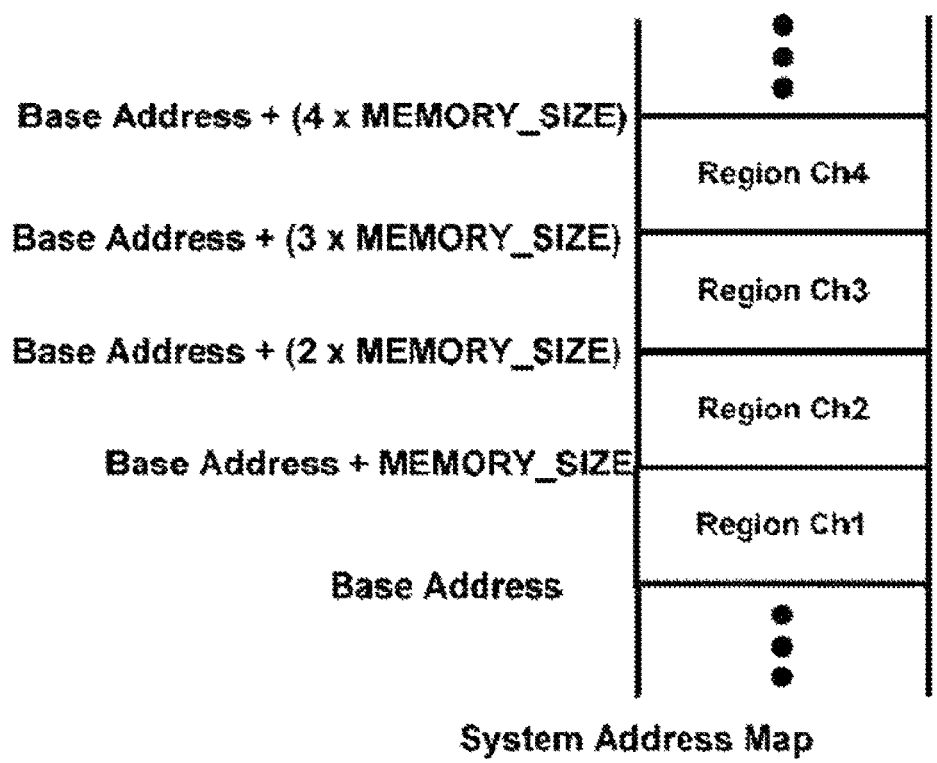
FIG. 14 is a diagram illustrating a case in which channel information/identification information and data and address order information are related according to an embodiment of the present disclosure.

FIG. 14 is a diagram illustrating a case in which channel information/identification information and data and address order information are associated according to an embodiment of the present disclosure.

Referring to FIG. 14, a process of allocating a memory area for each data group in a system address map is illustrated. MEMORY_SIZE is a size of the memory area of each data group.

The processor allocates a memory area of a memory to the system address map by various multiples, and each area represents a specific data group. For example, Channel 1 may be non-ANN data Channel 2 may be input learning data, Channel 3 may be weight data, and Channel 4 may be feature map data.

In the embodiment shown in FIG. 14, the data management device may determine which channel this access is made for by checking the most significant bit (MSB) of the address.

According to an embodiment of the present disclosure, it may be implemented so that only one data group can be stored in the same $n^{th}$ address n except for the MSB as an address in the memory area. This case is a method to avoid confusion between different data groups.

For example, it is a method of performing adjustment so as not to store another data in Base Address (Offset)+Channel×Memory_Size+address n, when certain data is stored in Base Address (Offset)+Memory_Size+address n.

With reference to FIG. 13 again, the embodiment of (3) Register Access will be described.

A register capable of representing a group of currently accessed data is formed in the data management device, and assigned to a system memory map as one address value. The processor first writes a data group representation value to this register before accessing data of one data group. In this manner, a data group or channel information can be shared between the processor and the data management device.

In the embodiment of FIG. 13, it has been described that there are four channels, but this is only an embodiment and the spirit of the invention is not limited thereto. In the case of 4 channels, the channels can be expressed as Channel 1 if a channel code is 00, Channel 2 if the channel code is 01, Channel 3 if the channel code is 10, and Channel 4 if the channel code is 11, but this is also only an embodiment, and the spirit of the invention is not limited thereto As described above, the greatest influence on the artificial neural network operation is whether data belongs to any group of data among input data, weight data, or feature map data. Meanwhile, for weight data or feature map data, since an order of data operations may be changed according to whether it is a read operation or a write operation, or it is in a training process or an inference process, a channel code may be subdivided into more than 2 bits to indicate an adaptively adjusted order.

An embodiment of the present disclosure shown in FIGS. 2 to 14 suggests a data management method and a method for supporting an artificial neural network operation, capable of responding adaptively even when a continuous pattern of an artificial neural network data operation is changed, through monitoring the artificial neural network data operation associated with the artificial neural network operation by the computing system or data management device of the present disclosure.

Meanwhile, embodiments of the present disclosure shown in FIGS. 2 to 14 are combined with an embodiment in which a process where an artificial neural network operation will be performed is analyzed in advance, data locality and order pattern of an artificial neural network data operation are extracted, and a memory configuration is reconfigured in software manner, so that the artificial neural network operation can be supported in more various ways.

Figure 15:
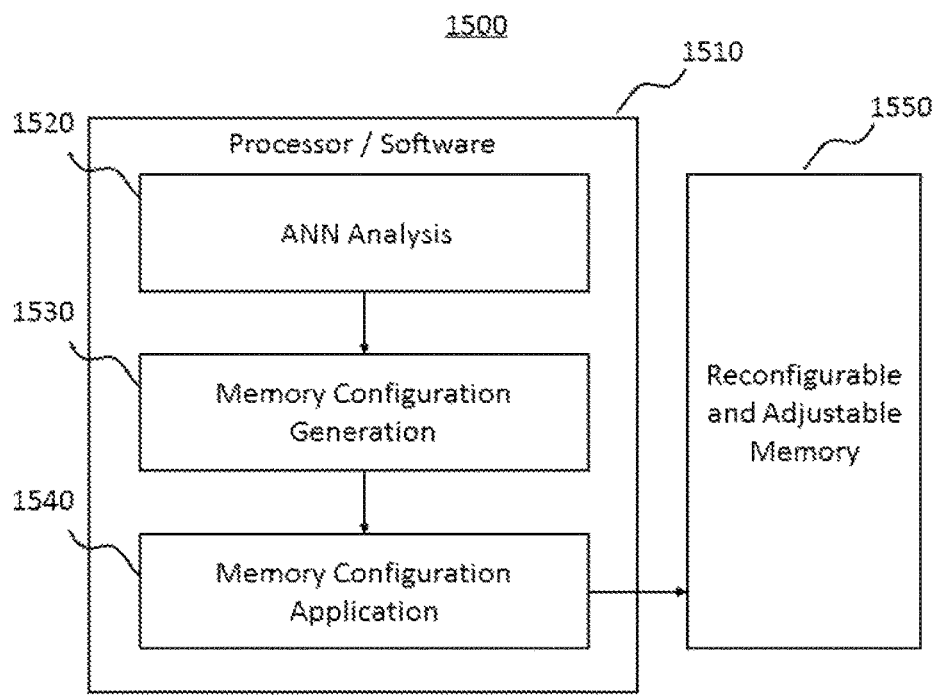
FIG. 15 is a diagram illustrating a data management device which is adaptively reconfigured to support an artificial neural network operation according to an embodiment of the present disclosure.

FIG. 15 is a diagram illustrating a data management device 1500 which is adaptively reconfigured to support an artificial neural network operation according to an embodiment of the present disclosure.

Referring to FIG. 15, the data management device 1500 includes at least one processor 1510 and a reconfigurable memory 1550. In this case, the data management device 1500 may correspond to a computing system. The data management device 1500 may be coupled with a communication interface or a user interface module that is not shown in the drawing, may receive a user's input and provide a response to the user, and may transmit and receive program instructions code and/or data to and from an external computing system, processor, or memory.

At least one processor 1510 may analyze a process in which an artificial neural network operation will be executed by program instructions executed in the at least one processor 1510, and extract an order pattern of an artificial neural network data operation associated with the artificial neural network operation. At this time, information such as a type, characteristic, and purpose of an artificial neural network is given, and at least one processor 1510 may extract the order pattern of the artificial neural network data operation in advance through simulation of the artificial neural network operation. A configuration for extracting the order pattern is shown as an artificial neural network analysis module 1520 in at least one processor 1510.

In this case, the artificial neural network analysis module 1520 in the at least one processor 1510 may extract the order pattern based on artificial neural network data locality of the artificial neural network data operation and the artificial neural network operation. The meaning of the artificial neural network data locality has been described above in the embodiment of FIG. 6.

At this time, the artificial neural network analysis module 1520 in at least one processor 1510 may extract the order pattern based on whether an artificial neural network data operation request is a request for input data for training, a request for a weight assigned to each synapse of the artificial neural network, or a request for an activation parameter, which is an operation result output to output nodes of the next layer from one layer, and whether a currently received data request corresponds to the artificial neural network data operation request.

At least one processor 1510 may generate an artificial neural network memory configuration information based on the order pattern of the artificial neural network data operation by program instructions executed in the at least one processor 1510. The artificial neural network memory configuration information may include information such as a size, a dimension, and an arrangement of a memory required for the artificial neural network data operation. A configuration for generating the artificial neural network memory configuration information is shown as a memory configuration generation module 1530 in at least one processor 1510.

The artificial neural network memory configuration information may include data between a processor side where an artificial neural network operation is performed and a memory where the data is stored, mapping between addresses where the data is stored, and order information, similarly to data and address order information included in the embodiments of FIGS. 2 to 14 described above.

The reconfigurable memory 1550 may be controlled so that the at least one processor 1510 can apply the artificial neural network memory configuration information to the reconfigurable memory 1550 by program instructions executed in the at least one processor 1510. A configuration for applying the artificial neural network memory configuration information to the reconfigurable memory 1550 is shown as a memory configuration application module 1540 in at least one processor 1510.

The artificial neural network analysis module 1520, the memory configuration generation module 1530, and the memory configuration application module 1540 may be implemented as separate hardware, may be implemented as software, and may be implemented by a combination of hardware and software.

As described in the embodiment of FIG. 2, an order in which write requests are made and an order in which read requests are made may coincide with each other, and when write requests are made, data operations may be performed in the order of the first type, while when read requests are made, data operations may be performed in the order of the second type.

The artificial neural network analysis module 1520 or the memory configuration generation module 1530 in the at least one processor 1510 may extract a run-time order pattern of an artificial neural network data operation based on structure and characteristic information of the artificial neural network associated with the artificial neural network operation, an order pattern, and whether the artificial neural network data operation is a read request or a write request.

The reconfigurable memory 1550 may store data necessary for an artificial neural network operation and may provide an artificial neural network data operation request corresponding to the artificial neural network operation as a response of the artificial neural network operation. At this time, an operation of the reconfigurable memory 1550 may be controlled by at least one processor 1510, and the at least one processor 1510 may perform or prepare a next artificial neural network data operation in advance while the current artificial neural network data operation is being conducted. A process in which the at least one processor 1510 performs or prepares the next artificial neural network data operation in advance while the current artificial neural network data operation is being conducted may be implemented with reference to the embodiments of FIGS. 2 to 14 described above.

Figure 16:
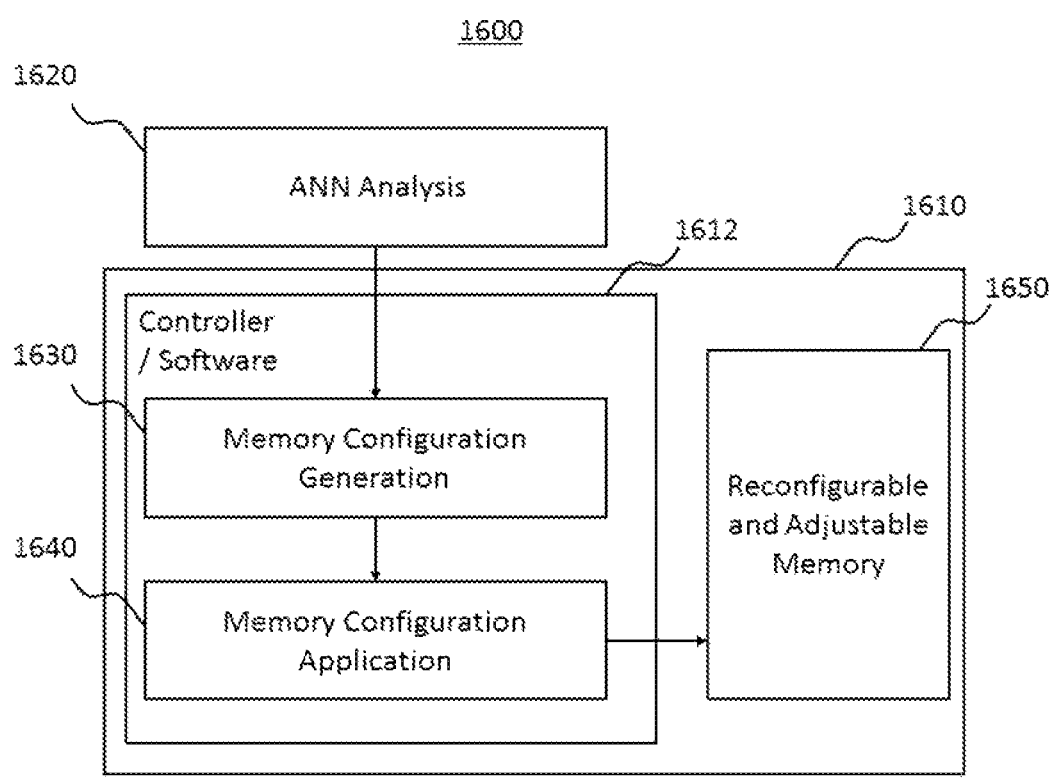
FIG. 16 is a diagram illustrating a data management device which is adaptively reconfigured to support an artificial neural network operation according to an embodiment of the present disclosure.

FIG. 16 is a diagram illustrating a data management device which is adaptively reconfigured to support an artificial neural network operation according to an embodiment of the present disclosure.

Referring to FIG. 16, a data management system 1600 may include a data management device 1610. The data management device 1610 includes a controller 1612 and a reconfigurable memory 1650.

An artificial neural network analysis module 1620 outside the data management device 1610 may extract an order pattern of an artificial neural network data operation based on a process in which the artificial neural network operation is executed. By program instructions executed in the controller 1612, the controller 1612 may receive the order pattern of the artificial neural network data operation from the artificial neural network analysis module 1620 via a communication interface not shown in FIG. 16.

A memory configuration generation module 1630 of the controller 1612 may generate artificial neural network memory configuration information based on the order pattern by the program instruction executed in the controller 1612. The artificial neural network memory configuration information may include data and address order information or information equivalent thereto. The controller 1612 may generate the artificial neural network memory configuration information based on physical configuration information of the reconfigurable memory 1650 and the order pattern.

The memory configuration generation module 1630 of the controller 1612 may extract a run-time order pattern of the artificial neural network data operation based on structure and characteristic information of the artificial neural network associated with the artificial neural network operation, the order pattern, and whether the artificial neural network data operation is a read request or a write request.

That is, the controller 1612 is based on the order pattern extracted by the artificial neural network analysis module 1520, but the controller 1612 may access the reconfigurable memory 1650 based on the run-time order pattern that is adaptively adjusted in actually providing the artificial neural network data operation corresponding to the artificial neural network operation.

When receiving the artificial neural network operation, the controller 1612 may cooperate with the reconfigurable memory 1650 based on the run-time order pattern and provide the artificial neural network data operation as a response to the artificial neural network operation. Such a process may be implemented with reference to the embodiments of FIGS. 2 to 14 described above.

A memory configuration application module 1640 of the controller 1612 may control the reconfigurable memory 1650 so that the artificial neural network memory configuration information is applied to the reconfigurable memory 1650 by the program instruction executed in the controller 1612.

In the embodiments of FIGS. 15 and 16, the reconfigurable memories 1550 and 1650 may be formed as physically general memories, or may be formed as a combination of general memories. At this time, a physical configuration of the reconfigurable memories 1550 and 1650 is not changed, but the reconfigurable memories 1550 and 1650 may be reconfigured logically or based on software. That is, sizes of logical sectors, blocks, planes, and the like inside the reconfigurable memories 1550 and 1650 may be reconstructed based on memory configuration information. The processor 1510 or the controller 1612 may pre-store typical memory configuration information corresponding to several types of typical artificial neural network operations, may select one among pieces of the memory configuration information that have been previously stored based on a user command, and may apply the selected one to the reconfigurable memories 1550 and 1650.

The artificial neural network operation may be executed by a separate computing system or processor, or may be executed by neural-mimicking hardware such as a neuromorphic recently proposed. The data management devices 1500 and 1610 including the reconfigurable memories 1550 and 1650 according to an embodiment of the present disclosure may be disposed at sites by combining with hardware or software that executes an artificial neural network operation. At this time, the processor 1510 or the controller 1612 may provide options of memory configuration information to a user via a user interface (not shown), and if one of the options of the memory configuration information is selected by a user command, may apply the selected option to the reconfigurable memories 1550 and 1650. When the processor 1510 or the controller 1612 provides options of memory configuration information to a user via a user interface (not shown), information such as a type of the artificial neural network corresponding to each option and a type of problem to be solved may be provided to the user together. A process of determining the memory configuration information by a user command may be executed in various cases, such as when the data management devices 1500 and 1610 are initialized in a factory, deployed in a field, or readjusted in a field.

At this time, the option of the memory configuration information may include a part of the run-time order pattern. For example, the option may be provided to allow a user to select the memory configuration information according to whether to preform learning/training using an artificial neural network, or infer a solution for a new problem using data and artificial neural networks that have already been learned.

In addition, a menu is provided to allow the user to select or input a size or dimensions of the artificial neural network, and logical dimensions of the reconfigurable memories 1550 and 1650 may be determined based on a user command input through the user menu.

The memory configuration information of the reconfigurable memories 1550 and 1650 in a run-time in which the artificial neural network operation is executed may be applied statically or dynamically. The memory configuration information which is determined once can be applied statically, if an error occurs in a specific area of the reconfigurable memories 1550 and 1650 in the run-time or data movement is required, the processor 1510 or the controller 1612 may dynamically change physical addresses of the reconfigurable memories 1550 and 1650, and may dynamically change the memory configuration information and apply it in the run-time.

The data management devices 1500 and 1610 may further include a read only memory (ROM) that is associated with the memory configuration generation modules 1530 and 1630 and stores a template of memory configuration information. Although it is described herein as a ROM, known programmable memories such as a programmable ROM, an EPROM, an EEPROM, a flash memory, and the like may be used.

Referring to FIGS. 15 and 16, the artificial neural network analysis modules 1520 and 1620 extract the order patterns by simulating or analyzing the execution of the artificial neural network operations in advance, and in this case, the order pattern including a branch, jump or flow of data may be extracted. Accordingly, when the embodiments of FIGS. 15 and 16 are provided as a data cache for an artificial neural network data operation, detailed optimization according to software profiling is possible, in addition to a case where data prefetch is simply performed.

In the embodiments of FIGS. 15 and 16, a reconfigurable memory platform capable of adjusting memory configurations of the data management devices 1500 and 1610 for supporting an artificial neural network operation based on an artificial neural network to be used by a user and problems to be solved is proposed. In addition, the reconfigurable memory platform can be adaptively optimized through software analysis of artificial neural networks. The data management devices 1500 and 1610 for supporting an artificial neural network operation according to the embodiments of the present disclosure may be understood as software or a memory compiler that is logically reconfigured.

A data management method for supporting an artificial neural network operation according to an embodiment of the present disclosure may be implemented in the form of program instructions that can be executed through various computer means and recorded in a computer-readable medium. The computer-readable medium may include program instructions, data files, data structures, and the like alone or in combination. The program instructions recorded on the medium may be specially designed and configured for the present disclosure, or may be known and usable to those skilled in computer software. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program instructions such as a ROM, a RAM, a flash memory, and the like. Examples of the program instructions include not only machine language codes such as those produced by a compiler, but also high-level language codes that can be executed by a computer using an interpreter or the like. The above-described hardware device may be configured to operate as one or more software modules to perform the operation of the present disclosure, and vice versa.

However, the present disclosure is not limited or restricted by the embodiments. The same reference numerals in respective drawings indicate the same members. A length, a height, a size, a width and the like that are introduced in the embodiments and the drawings of the present disclosure may be exaggerated to aid understanding.

Hereinabove, although the present disclosure is described by specific matters such as concrete components, and the like, embodiments, and drawings, they are provided only for assisting in the entire understanding of the present disclosure. Therefore, the present disclosure is not limited to the embodiments. Various modifications and changes may be made by those skilled in the art to which the present disclosure pertains from this description.

Therefore, the spirit of the present disclosure should not be limited to the above-described embodiment, and the following claims as well as all modified equally or equivalently to the claims are intended to fall within the scope and spirit of the invention.

INDUSTRIAL APPLICABILITY

Disclosed is a data cache or data management device for caching data between at least one processor and at least one memory, and supporting an artificial neural network (ANN) operation executed by the at least one processor. The data cache device or the data management device can comprise an internal controller for predicting the next data operation request on the basis of ANN data locality of the ANN operation. The internal controller monitors data operation requests associated with the ANN operation from among data operation requests actually made between the at least one processor and the at least one memory, thereby extracting the ANN data locality of the ANN operation.

The invention claimed is:

1. A data management device for supporting an artificial neural network operation, comprising:
    a processor interface circuit for receiving an artificial neural network data operation request associated with an artificial neural network operation which is executed by at least one processor;
    a memory interface circuit for transmitting a memory data operation request based on the artificial neural network data operation request to at least one memory, and receiving memory data in response to the memory data operation request from the at least one memory; and
    an internal controller for generating the memory data operation request based on the artificial neural network data operation request,
    wherein the internal controller identifies a domain and a type of the artificial neural network data operation request based on identification information included in the artificial neural network data operation request,
    wherein the internal controller generates data and address order information, that is an order of data of the artificial neural network data operation request associated with the identification information and an address in which the data of the artificial neural network data operation request is stored in the order in the at least one memory, and stores the data and address order information in an internal memory,
    wherein when receiving a first artificial neural network data operation request, the internal controller generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the internal memory.

2. The data management device of claim 1, wherein the identification information includes information on whether the artificial neural network data operation request is a request for input data for training, a request for a weight assigned to each synapse of an artificial neural network, or a request for an activation parameter, which is an operation result output to output nodes of a next layer from one layer of the artificial neural network, and whether a currently received data request corresponds to the artificial neural network data operation request.

3. The data management device of claim 1, wherein after receiving the first artificial neural network data operation request, the internal controller predicts the second artificial neural network data operation request which is expected to follow the first artificial neural network data operation request based on first identification information included in the first artificial neural network data operation request.

4. The data management device of claim 1, wherein after receiving the first artificial neural network data operation request, the internal controller generates a first memory data operation request including the first address information, and sends the first memory data operation request to the memory interface circuit.

5. The data management device of claim 1, wherein after receiving the first artificial neural network data operation request, the internal controller generates a second memory data operation request including the next address information based on the first artificial neural network data operation and sends the second memory data operation request to the memory interface circuit.

6. The data management device of claim 5, wherein at least one of the internal controller or the memory interface circuit transmits the second memory data operation request to the at least one memory, controls the at least one memory so that the at least one memory performs a memory operation corresponding to the second memory data operation request, and receives data corresponding to the second memory data operation request from the at least one memory when the second memory data operation request is a read operation.

7. The data management device of claim 5, wherein at least one of the internal controller or the memory interface circuit transmits the second memory data operation request to the at least one memory and controls the at least one memory so that the at least one memory maintains a ready state capable of performing a memory operation corresponding to the second memory data operation request.

8. The data management device of claim 1, wherein when actually receiving a third artificial neural network data operation request that follows the first artificial neural network data operation request from the at least one processor, the internal controller checks whether third address information with which data of the third artificial neural network data operation request is stored in the at least one memory coincides with the next address information which has been previously generated in the internal controller.

9. The data management device of claim 3, wherein when using the data and address order information stored in the internal memory, the internal controller determines adaptive order information used to generate the next address information, based on structure and characteristic information of the artificial neural network associated with the artificial neural network operation, whether the first artificial neural network data operation request is a read request or a write request, and first identification information included in the first artificial neural network data operation request, and the internal controller predicts the second artificial neural network data operation request based on the adaptive order information and the data and address order information stored in the internal memory, and generates the next address information.

10. The data management device of claim 1, wherein the internal controller generates, as the first address information, information of a current address in which data of the first artificial neural network data operation request is stored in the at least one memory using the data and address order information stored in the internal memory even when the first artificial neural network data operation request does not include an address, based on first identification information included in the first artificial neural network data operation request and whether the first artificial neural network data operation request is a read request or a write request.

11. The data management device of claim 8, wherein if the third address information does not coincide with the next address information which has been previously generated in the internal controller,
the memory interface circuit transmits a third memory data operation request including the third address information to the at least one memory, and,
the internal controller updates the data and address order information so that the third address information of the third artificial neural network data operation request follows next to the first address information of the first artificial neural network data operation request, and store the updated data and address order information in the internal memory.

12. The data management device of claim 1, further comprising: a read data buffer memory that when the first artificial neural network data operation request is a read request, performs a readahead operation on data which is predicted as the second artificial neural network data operation request from the at least one memory based on the next address information, and then, stores readahead data, which is a result of the readahead operation.

13. A computing system having at least one processor and at least one memory and supporting an artificial neural network operation executed by the at least one processor, the computing system comprising:
a processor-side interface for receiving an artificial neural network data operation request associated with the artificial neural network operation executed by the at least one processor;
a memory-side interface for transmitting a memory data operation request based on the artificial neural network data operation request to the at least one memory, and receiving memory data in response to the memory data operation request from the at least one memory; and
a data order memory for storing data and address order information,
wherein the computing system generates the memory data operation request based on the artificial neural network data operation request,
wherein the computing system identifies a domain and a type of the artificial neural network data operation request based on identification information included in the artificial neural network data operation request,
wherein the computing system generates an order of data of the artificial neural network data operation request associated with the identification information, and information of an address in which the data of the artificial neural network data operation request is stored in the order in the at least one memory, as the data and address order information,
wherein when the processor-side interface receives a first artificial neural network data operation request, the computing system generates, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

14. The computing system of claim 13, wherein after the processor-side interface receives the first artificial neural network data operation request, the second artificial neural network data operation request which is expected to follow the first artificial neural network data operation request is predicted based on first identification information included in the first artificial neural network data operation request.

15. The computing system of claim 13, wherein after the processor-side interface receives the first artificial neural network data operation request, a second memory data operation request including the next address information is generated based on the first artificial neural network data operation, and transmitted to the at least one memory via the memory-side interface.

16. The computing system of claim 13, further comprising: a read data buffer memory that performs a readahead operation on data which is predicted as the second artificial neural network data operation request from the at least one memory based on the next address information when the first artificial neural network data operation request is a read request, and then, stores readahead data, which is a result of the readahead operation.

17. The computing system of claim 13, wherein the memory-side interface transmits the memory data operation request to the at least one memory or at least one external memory outside the computing system, and receives memory data in response to the memory data operation request from the at least one memory or the at least one external memory.

18. A data management method for supporting an artificial neural network operation, performed in a computing system having at least one processor and at least one memory and supporting an artificial neural network operation executed by the at least one processor, the data management method comprising:
receiving an artificial neural network data operation request associated with the artificial neural network operation executed by the at least one processor;
transmitting a memory data operation request based on the artificial neural network data operation request to the at least one memory and receiving memory data in response to the memory data operation request from the at least one memory; and
generating the memory data operation request based on the artificial neural network data operation request,
wherein the generating of the memory data operation request based on the artificial neural network data operation request includes:

identifying a domain and a type of the artificial neural network data operation request based on identification information included in the artificial neural network data operation request;

generating an order of data of the artificial neural network data operation request associated with the identification information, and information of an address in which the data of the artificial neural network data operation request is stored in the order in the at least one memory, as the data and address order information;

storing the data and address order information in a data order memory inside the computing system; and when receiving a first artificial neural network data operation request, generating, as next address information, information of a second address in which data of a second artificial neural network data operation request that follows the first artificial neural network data operation request is stored in the at least one memory based on information of a first address in which data of the first artificial neural network data operation request is stored in the at least one memory, and the data and address order information stored in the data order memory.

19. The data management method of claim 18, wherein the generating of the information of the second address as the next address information includes:

after receiving the first artificial neural network data operation request, predicting the second artificial neural network data operation request which is expected to follow the first artificial neural network data operation request based on first identification information included in the first artificial neural network data operation request; and predicting the information of the second address in which the data of the second artificial neural network data operation request is stored in the at least one memory based on the information of the first address and the data and address order information.

20. The data management method of claim 18, further comprising:

after receiving the first artificial neural network data operation request, generating a second memory data operation request including the next address information based on the first artificial neural network data operation; and transmitting the second memory data operation request to the at least one memory via a memory-side interface.

* * * * *